(12) United States Patent
Xia et al.

(10) Patent No.: US 11,638,899 B2
(45) Date of Patent: May 2, 2023

(54) WATER HARVESTING DEVICE

(71) Applicant: The Johns Hopkins University, Baltimore, MD (US)

(72) Inventors: Zhiyong Xia, Rockville, MD (US); Matthew W. Logan, Columbia, MD (US); Spencer A. Langevin, Columbia, MD (US); Scott A. Shuler, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 169 days.

(21) Appl. No.: 17/209,386

(22) Filed: Mar. 23, 2021

(65) Prior Publication Data

US 2021/0299607 A1  Sep. 30, 2021

Related U.S. Application Data

(60) Provisional application No. 62/993,762, filed on Mar. 24, 2020, provisional application No. 63/122,515, filed on Dec. 8, 2020.

(51) Int. Cl.
*B01D 53/04* (2006.01)
*B01D 53/26* (2006.01)
(Continued)

(52) U.S. Cl.
CPC ......... *B01D 53/261* (2013.01); *B01D 53/047* (2013.01); *B01D 53/0423* (2013.01);
(Continued)

(58) Field of Classification Search
CPC .. B01D 53/261; B01D 53/04; B01D 53/0423; B01D 53/0438; B01D 53/0462; B01D 53/047; B01D 53/28; B01D 2253/202; B01D 2253/204; B01D 2253/25; B01D 2253/304; B01D 2253/306; B01D 2253/308; B01D 2257/80; B01D 2259/402; B01D 2259/414; B01D 2258/06;
(Continued)

(56) References Cited

U.S. PATENT DOCUMENTS 5,648,508 A * 7/1997 Yaghi ................... B01J 31/1691
556/9
10,561,761 B2   2/2020 Xiao et al.
(Continued)

OTHER PUBLICATIONS

Zhiyong Xia, et al., "Determination of Crosslinking Density of Hydrogels Prepared from Microcrystalline Cellulose," J. Appl. Polym. Sci. 2013, Jun. 6, 2012, DOI: 10.1002/APP.38052, pp. 4537-4541.
(Continued)

*Primary Examiner* — Frank M Lawrence, Jr.
(74) *Attorney, Agent, or Firm* — Noah J. Hayward

(57) ABSTRACT

A water harvesting device includes at least a first adsorption column including a first inlet, a first outlet, and a first interior region. A sorbent material is located within the first interior region of the first adsorption column. The sorbent material includes a metal organic framework (MOF) material including a plurality of metal ions or clusters of metal ions coordinated to one or more organic linkers, a plurality of nanofabrics comprising a hydrogel material, or a combination thereof.

20 Claims, 10 Drawing Sheets

(51) Int. Cl.
  *B01J 20/22*    (2006.01)
  *B01D 53/047*   (2006.01)
  *B01D 53/28*    (2006.01)
  *B01J 20/26*    (2006.01)
  *B01J 20/24*    (2006.01)
  *B01J 20/28*    (2006.01)
  *B01J 20/30*    (2006.01)

(52) U.S. Cl.
  CPC ..... *B01D 53/0438* (2013.01); *B01D 53/0462* (2013.01); *B01D 53/28* (2013.01); *B01J 20/226* (2013.01); *B01J 20/24* (2013.01); *B01J 20/264* (2013.01); *B01J 20/2803* (2013.01); *B01J 20/2808* (2013.01); *B01J 20/28011* (2013.01); *B01J 20/28047* (2013.01); *B01J 20/28064* (2013.01); *B01J 20/28066* (2013.01); *B01J 20/28083* (2013.01); *B01J 20/3085* (2013.01); *B01D 2253/202* (2013.01); *B01D 2253/204* (2013.01); *B01D 2253/25* (2013.01); *B01D 2253/304* (2013.01); *B01D 2253/306* (2013.01); *B01D 2253/308* (2013.01); *B01D 2257/80* (2013.01); *B01D 2259/402* (2013.01); *B01D 2259/414* (2013.01); *B01J 2220/46* (2013.01); *B01J 2220/606* (2013.01)

(58) Field of Classification Search
  CPC ......... B01D 53/02; B01J 20/226; B01J 20/24; B01J 20/264; B01J 20/28011; B01J 20/2803; B01J 20/28047; B01J 20/28064; B01J 20/28066; B01J 20/2808; B01J 20/28083; B01J 20/3085; B01J 2220/46; B01J 2220/606
  USPC .............. 96/108, 121, 126–128, 146; 95/96, 95/117–126; 34/80, 472, 473
  See application file for complete search history.

(56) References Cited

U.S. PATENT DOCUMENTS

| | | | |
|---|---|---|---|
| 2020/0282379 A1* | 9/2020 | Mu | B01J 20/06 |
| 2021/0055010 A1* | 2/2021 | McGrail | F24F 3/153 |
| 2021/0069639 A1* | 3/2021 | Wang | B01D 53/261 |
| 2021/0156124 A1* | 5/2021 | Yaghi | B01D 53/265 |
| 2021/0283574 A1* | 9/2021 | Yaghi | E03B 3/28 |
| 2022/0280915 A1* | 9/2022 | Yilmaz Kanargi | B01J 20/28047 |

OTHER PUBLICATIONS

Zhiyong Xia, et al., "Structure and relaxation in cellulose hydrogels," J. Appl. Polym. Sci. 2015, DOI: 10.1002/APP.42071, Jan. 30, 2015, pp. 1-5.
Zhiyong Xia, et al., "Heavy metal ion removal by thiol functionalized aluminum oxidehydroxide nanowhiskers," Applied Surface Science 416, Apr. 20, 2017, pp. 565-573.
James K. Johnson, et al., "Advanced Filtration Membranes for the Removal of Perfluoroalkyl Species from Water," ACS Omega, May 2, 2019, 4, pp. 8001-8006.
Konstantinos Gerasopoulos, et al., "Effects of Engineered Wettability on the Efficiency of Dew Collection," ACS Appl. Mater. Interfaces Jan. 3, 2018, 10, pp. 4066-4076.
Chao-Wei Hwang, et al., "Stem cell impregnated nanofiber stent sleeve for on-stent production and intravascular delivery of paracrine factors," Biomaterials 52, Feb. 28, 2015, pp. 318-326.
Nikita Hanikel, "Rapid Cycling and Exceptional Yield in a Metal-Organic Framework Water Harvester," ACS Cent. Sci., Aug. 27, 2019, 5, pp. 1699-1706.
Fei Zhao, et al., "Super Moisture-Absorbent Gels for All-Weather Atmospheric Water Harvesting," Adv. Mater., 2019, 31, 1806446 pp. 1-7.
Pedro J. Rivero, "Nanomaterials for Functional Textiles and Fibers," Rivero et al. Nanoscale Research Letters, 2015, 10:501, pp. 1-22.
Shingjiang Jessie Lue, et al., "Tuning of Lower Critical Solution Temperature (LCST) of Poly(N-Isopropylacrylamide-co-Acrylic acid) Hydrogels," Journal of Macromolecular Science, Part B, 50:3, Jan. 24, 2011, DOI: 10.1080/00222341003784550, pp. 563-579.

* cited by examiner

WATER HARVESTING DEVICE

CROSS-REFERENCE TO RELATED APPLICATIONS

This application claims priority to and the benefit of prior-filed U.S. Provisional Application Ser. Nos. 62/993,762 and 63/122,515, filed Mar. 24, 2020 and Dec. 8, 2020, respectively, the contents of which are herein incorporated by reference in their entireties.

TECHNICAL FIELD

Example embodiments relate generally to water harvesting devices. More particularly, such water harvesting devices include one or more adsorption columns, e.g., a temperature swing adsorption (TSA) column and/or a pressure swing adsorption (PSA) column. The adsorption column includes a sorbent material, which retains (e.g., adsorbs) and, thereafter, releases water from an air source passing through the TSA and/or the PSA.

BACKGROUND

Despite the rapid growth of modern infrastructure, access to clean water remains a critical issue and challenge that is projected to increase at a rate faster than that of energy production. Limited access to fresh water due to the absence of sources, such as lakes, rivers, and groundwater is becoming even more problematic, with many of these sources becoming contaminated, such as from human activities. Traditional, existing means to acquire clean water, such as reverse osmosis and distillation, are costly and energy-intensive, which in turn restricts viable real-world use and implementation of such traditional means.

The passive capture of clean water from humid air, without reliance on bulky equipment and high energy, has been a substantial challenge. Such an approach, however, could provide a potential environmentally friendly alternative to traditional water harvesting methods. Direct water harvesting from air has been demonstrated through cooling water vapor below its saturation pressure. However, this approach is not practical, especially in dry climates, due to its high energy demands. Thus, there remains a significant need in the art for alternative devices and methods of harvesting water from air or other media.

BRIEF SUMMARY

A water harvesting device according to an example embodiment includes at least a first adsorption column including a first inlet, a first outlet, and a first interior region. A sorbent material is located within the first interior region of the first adsorption column. The sorbent material includes a metal organic framework (MOF) material including a plurality of metal ions or clusters of metal ions coordinated to one or more organic linkers, a plurality of nanofabrics comprising a hydrogel material, or a combination thereof.

A method of harvesting water from air according to an example embodiment includes providing a water harvesting device. The water harvesting device includes at least a first adsorption column including a first interior region and a first sorbent material located within the first interior region of the first adsorption column. The first sorbent material includes a metal organic framework (MOF) material including a plurality of metal ions or clusters of metal ions coordinated to one or more organic linkers, a plurality of nanofabrics comprising a hydrogel material, or a combination thereof. The method further includes initiating intake of air from an environment into the water harvesting device, retaining water on or within the first sorbent material, releasing at least a portion of the water retained by the first sorbent material by directly or indirectly increasing a temperature of the first sorbent material, and collecting at least a portion of the released water.

BRIEF DESCRIPTION OF THE DRAWINGS

Some non-limiting, example embodiments will now be described more fully hereinafter with reference to the accompanying drawings, in which some, but not all, embodiments of the invention are shown. Indeed, this invention may be embodied in many different forms and must not be construed as being limited to the example embodiments set forth herein; rather, these embodiments are provided as examples only so that this disclosure will satisfy applicable legal requirements. Like numbers refer to like elements throughout, and wherein.

DETAILED DESCRIPTION

Figure 1:
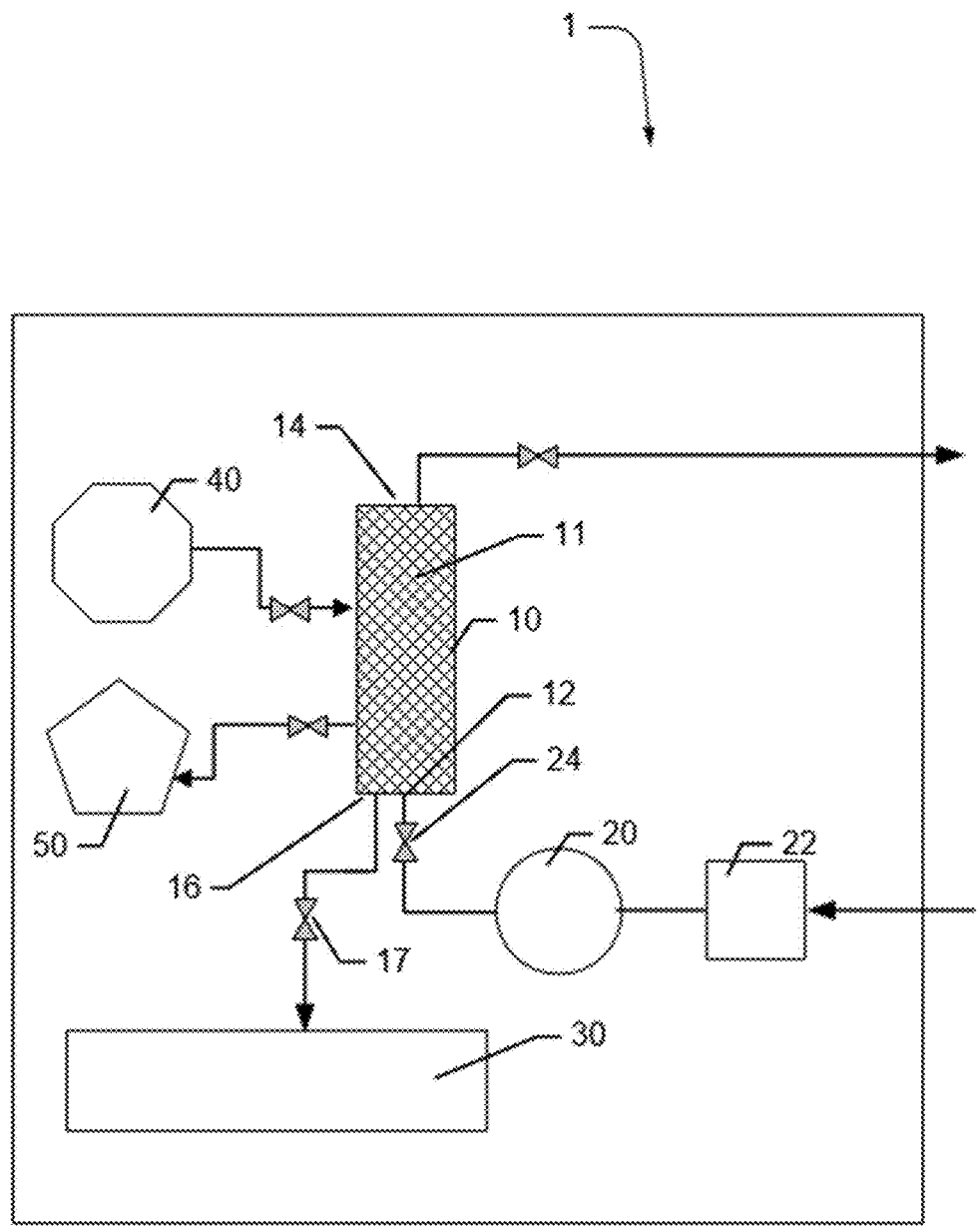
FIG. 1 illustrates a schematic of a water harvesting device according to an example embodiment.

Example embodiments will now be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Example embodiments relate generally to accessing non-traditional water reserves, such as atmospheric water vapor. In this regard, example embodiments provide the ability to supply freshwater on-demand virtually anywhere on the earth. For example, atmospheric water harvesting, in accordance with example embodiments, provides an attractive alternative by enabling access to the omnipresent water vapor in the earth's atmosphere off the grid and in virtually any environment. Accordingly, example embodiment provide water harvesting devices that may include one of more absorption columns housing one or more sorption materials. The absorption columns may include one or more temperature swing adsorption (TSA) column and/or one or more pressure swing adsorption (PSA) columns that house one or more sorption materials therein. In accordance with example embodiments, for example, the water harvesting device may include a sorption material including one or more metal-organic frameworks (MOFs) and/or one or more hydrogel-based porous nanofabrics (e.g., consolidated or non-consolidated mat of nanofibers, yarns) that harvest (e.g., capture) water from air. In this regard, a first absorption column may include one or more MOFs and a second absorption column may include one or more hydrogel-based porous nanofabrics (e.g., consolidated or non-consolidated mat of nanofibers). Additionally or alternatively, an absorption column may include the combination of one or more MOF materials with one or more hydrogel-based porous nanofabrics (e.g., consolidated or non-consolidated mat of nanofibers). In accordance with certain embodiments of the one or more absorption columns of the water harvesting device may be operated in accordance with a temperature swing adsorption process and/or a pressure swing adsorption process to effectuate the selective capture of water from air and release of the captured water in liquid form. In accordance with example embodiments, the sorbent material may include one or more covalent organic framework (COF). The COFs may include two-dimensional or a three-dimensional organic solids with extended structures in which building blocks are linked by strong covalent bonds. The COFs include a porous and crystalline structure that may be made entirely from light elements (e.g., H, B, C, N, and O) that may form strong covalent bonds. Similar to the MOFs, the COFs provide frameworks that can be functionalized in a manner similar to those described herein with respect to MOFs. In accordance with example embodiments, the disclosure of properties associated with one or more MOFs may also be attributed to one or more COFs. In this regard, example embodiments include one or more COFs alone or in combination with one or more MOFs, hydrogel-based nanofibers or particulate-composite material (PCM) including (i) a binder material and (ii) the MOF and/or the plurality of nanofibers. A PCM may also include a binder material and a COF (alone or in combination with a MOF and/or a plurality of nanofibers). It will be appreciated that discussion and disclosure of MOFs in water harvesting devices are equally applicable to water harvesting devices including one or more COFs in accordance with example embodiments.

In accordance with example embodiments, the MOF materials generally include a high surface area and may optionally include one or more organic linkers that impart increased polarity to the MOF material. Hydrogel-based porous nanofabrics, for example, may be formed from a hydrogel material produced from a super water absorbing ionic liquid (e.g., 1-ethyl-3-methyl-imidazolium acetate) copolymerized with, for example, N-isopropylacrylamide. In accordance with example embodiments, the hydrogels may be electrically spun into nanofibers to form nanofabrics (e.g., consolidated or non-consolidated plurality of nanofibers). In accordance with example embodiments, solvent selection in the electro-spinning process of the hydrogels may facilitate or create the formation of surface porosities on the surface of the nanofibers to provide fast water diffusion and desorption of the resulting nanofibers In accordance with example embodiments, the water harvesting device may include the combination of both MOF materials and hydrogels (e.g., in the form of nanofibers or nanofabrics including such nanofibers) to enable the treatment of air with a relative humidity ranging from, for example, 10-100%. For instance, the hydrogel material may be particularly useful in the rapid capture of water from moderate to more humid air (e.g., 30-100% relative humidity) while the MOF material may be more efficient at capturing water from less humid air (e.g., less than 30% relative humidity). In accordance with example embodiments, the water harvesting device may include a condenser (e.g., a Peltier device) operatively connected to a liquid water discharge from one or more adsorption columns, in which the condenser may include a hydrophobic surface coated thereon, to assist in effective water droplet coalescence and formation during the desorption state of an adsorption column.

In accordance with example embodiments, the water harvesting device utilizes one or more MOF materials and/or one or more super swelling hydrogels that have been spun into nanofabrics and/or nanofibers. In accordance with example embodiments, the nanofibers may include a highly porous nature. For example, the surface area of the nanofibers may include a plurality of pores or pits formed therein. Additionally or alternatively, the nanofibers may have such a highly porous nature throughout the entire thickness of the nanofibers.

Although some MOF materials have been shown to capture and desorb water from air, many of these MOF materials provide limited water production, as such MOF materials suffer from insufficient water production and slow desorption kinetics due to their low intrinsic thermal conductivity, poor mass transport, and inadequate balance between hydrophilicity and pore sizes. In accordance with example embodiments, the MOF materials may include a combination of polar functionalities in the organic linkers of the MOF materials and/or a tailored pore topology offering higher water adsorption and desorption kinetics.

As referenced above and discussed in greater detail below, the hydrogel material provided in the form of nanofibers as a sorbent material may be derived from a super water absorbing ionic liquid (e.g., 1-ethyl-3-methyl-imidazolium acetate) copolymerized with, for example, N-isopropylacrylamide (NIPAM), and thus does not require lithium salts for water capture as reported in the literature. In this regard, the nanofabrics and/or nanofibers including the hydrogel material may be devoid of lithium salts. In accordance with example embodiments, the nanofiber have nano-scaled diameters facilitate improvement in diffusion kinetics and water desorption rates. For example, the diffusion kinetics and water desorption rates may both be significantly accelerated.

In accordance with example embodiments, the water harvesting devices may include a combination of one or more MOF materials and one or more nanofabrics and/or nanofibers formed from the hydrogel materials disclosed and described herein, in which the water harvesting devices may extract water from both a low moisture content air (e.g., 4° C./50% RH and 27° C./10% RH, both contain about 2-4 g water/kg of air) and a high moisture content air (e.g., 43° C./60% RH with a water content of 37 g/kg air), respectively.

FIG. 1 illustrates a schematic of a water harvesting device 1 according to example embodiments, in which the water harvesting device includes an adsorption column 10 housing a sorbent material 11 therein. Although FIG. 1 illustrates only a single adsorption column 10, a plurality of such adsorption columns 10 are contemplated and described below. Atmospheric air 3 may be pulled into the water harvesting device 1 via an air intake apparatus 20 (e.g., a fan 20) and conveyed into the adsorption column 10 through an incoming air flow valve 24 and inlet 12. Optionally and as shown in FIG. 1, the water harvesting device 1 may include a pre-filter 22 positioned between the air intake apparatus 20 and an air inlet of the water harvesting device 1. The airflow passes through the adsorption column 10 and exits the adsorption column through an outlet 14 where the airflow may be expelled out of an air outlet of the water harvesting device 1. In accordance with example embodiments, the adsorption column 10 captures or retains water from the airflow passing therethrough under a first set of operating conditions, and desorbs or releases water (e.g., liquid water) under a second set of operating conditions. During desorbing or releasing water under the second set of operating conditions, the water (e.g., liquid water) may exit the adsorption column via a liquid water outlet 16 and pass through a valve 17 to a liquid water collection component 30 (e.g., a tank 30 or a vessel 30).

In accordance with example embodiments, the adsorption column 10 may include a TSA column, in which the adsorption column 10 operates as part of a temperature adsorption swing process. For instance, the adsorption column 10 may capture or retain water from the airflow being conveyed through the adsorption column 10 under a first set of operating conditions, such as a first temperature, and desorb or release previously captured or retained water under a second set of operating conditions, such as a second temperature that is greater than the first temperature. Accordingly, the water harvesting device 1 may also include a heat source 40 operatively connected to the adsorption column 10. The heat source 40 is not limited to any particular device, but may include a means of conveying a heated gas directly through the adsorption column 10 (e.g., in direct contact with the sorbent material 11) or indirectly through a jacket surrounding at least a portion of the adsorption column 10 or heating tubes located within the adsorption column 10. Additionally or alternatively, the heat source 40 may include an electrically powered heater. In accordance with example embodiments, the adsorption column 10 may include a PSA column, in which the adsorption column 10 operates as part of a pressure adsorption swing process. For instance, the adsorption column 10 may capture or retain water from the airflow being conveyed through the adsorption column 10 under a first set of operating conditions, such as a first pressure, and desorb or release previously captured or retained water under a second set of operating conditions, such as a second pressure that is lower than the first pressure. Accordingly, the water harvesting device 1 may also include a vacuum source 50 operatively connected to the adsorption column 10. The vacuum source 50 is not limited to any particular device, but may include a vacuum pump, a fan, steam ejector, or other device capable of changing, e.g., raising or reducing, the pressure inside the adsorption column 10.

The term "temperature swing adsorption" (TSA), as used herein, refers to a process that relies on temperature differences and associated pressure differences for different operating conditions. For instance, under pressure and relatively moderate to low temperatures water in vapor form tends to be captured or retained within the sorbent materials. When the temperature of the sorbent material is increased, the captured or retained water is released, or desorbed. By cyclically swinging the temperature of adsorption columns including the sorbent material, TSA processes can be used to harvest or pull water from an ambient or atmospheric air when used with sorbent materials having affinity for water.

The term "pressure swing adsorption" (PSA), as used herein, refers to a process used to separate a gas species (e.g., water) from a mixture of gases (e.g., air) under pressure according to the gas species' (e.g., water) molecular characteristics and affinity for a sorbent material. A PSA process may operate at near-ambient temperatures and differs significantly from cryogenic distillation techniques of gas separation. Many PSA processes operate partially at pressures below atmospheric and are described in the art as vacuum swing adsorption (VSA) or pressure-vacuum swing adsorption (PVSA) processes. Herein, PSA is used as a generic term to describe all types of cyclic adsorption systems regardless of operating pressure levels. In PSA processes, the sorbent material captures or retains a gas species (e.g., water) under a first pressure and releases or desorbs the previously captured gas species (e.g., water) under a second pressure that is less than the first pressure.

Example embodiments include a water harvesting device having at least one adsorption column (e.g., a TSA column and/or a PSA column), in which the at least one adsorption column includes at least a first adsorption column including a first inlet, a first outlet, and a first interior region. The water harvesting device may also include a sorbent material located within the first interior region of the first adsorption column, in which the sorbent material includes (a) a porous media including a metal organic framework (MOF) material including a plurality of metal ions or clusters of metal ions coordinated to one or more organic linkers, (b) a hydrogel-based nanofabric material, or (c) the combination of (a) and (b).

Figure 2A:
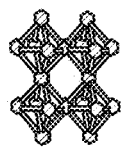
FIG. 2A illustrates a generic structure for a metal-organic framework (MOF) according to an example embodiment.
Figure 2B:
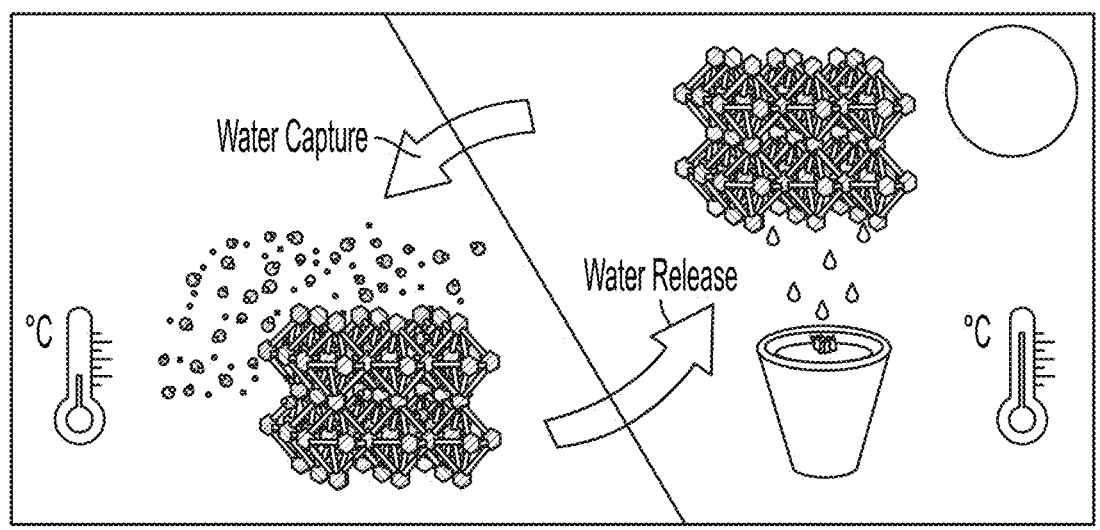
FIG. 2B illustrates a general cycle of water capture from atmospheric air by a MOF material at a first temperature and release of the water at a temperature higher than the first temperature according to an example embodiment.
Figure 2C:
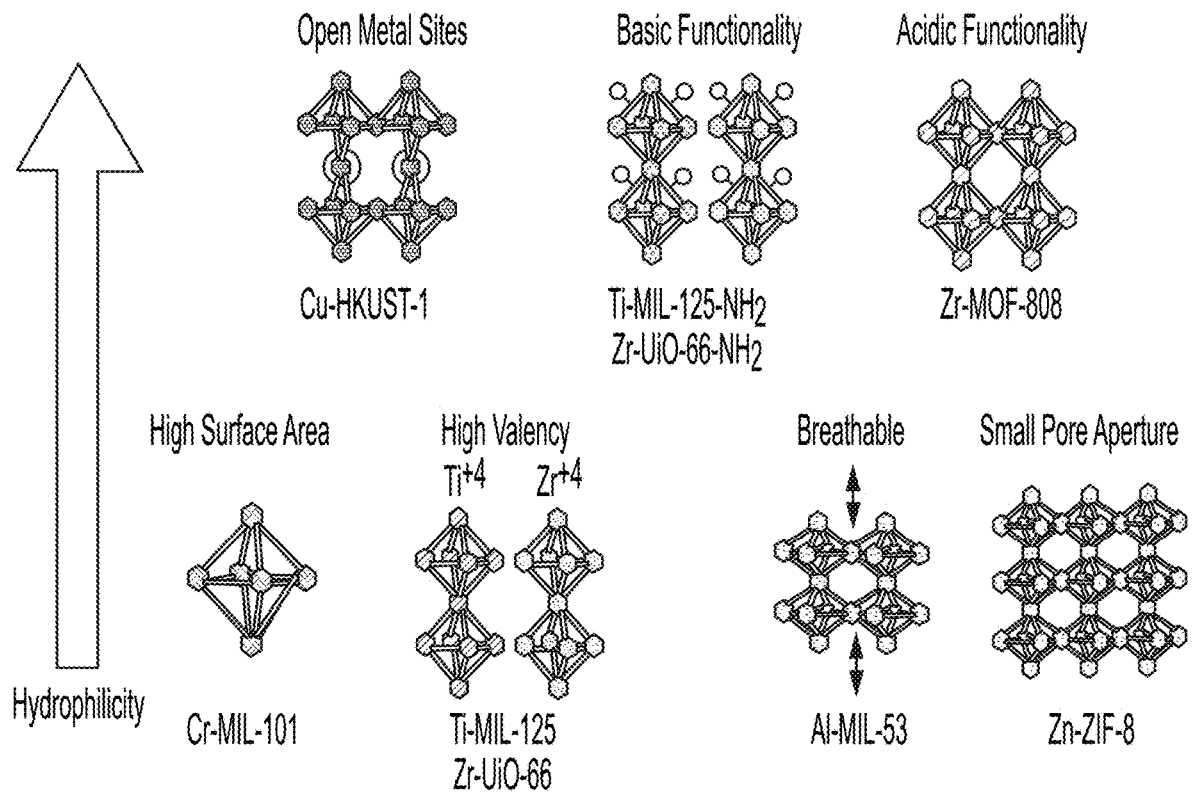
FIG. 2C illustrates structures of various MOF materials in accordance with an example embodiment.

In accordance with example embodiments the MOF material has a generally porous structure. For instance, the MOF material may include a plurality of pores defined by the plurality of metal ions or clusters of metal ions that are coordinated with one or more organic linkers as generally illustrated by FIG. 2A. FIG. 2B illustrates a general cycle of water capture from atmospheric air by a MOF material at a first temperature and release of the water at a temperature higher than the first temperature according to example embodiments. As noted above and generally illustrated by FIG. 2B, the MOF material attracts and/or retains (e.g., adsorbs) water at a first temperature and/or a first pressure, and releases water at a second temperature and/or pressure; wherein the first temperature is less than the second temperature and/or the first pressure is larger than the second pressure. FIG. 2C illustrates structures of various MOF materials in accordance with example embodiments, in which the different structures provide differing porosities, functionalities, and hydrophilicity.

In accordance with example embodiments, the MOF material includes an average pore size from about 5 angstroms (Å) to about 300 Å, such as at least about any of the following: 5, 10, 15, 20, 30, 40, 50, 60, 70, 80, 90, 100, 125, 150, 175, and 200 Å, and/or at most about any of the following: 300, 275, 250, and 200 Å. Additionally or alternatively, the MOF material may have an average surface area from about 800*NJH/g to about 3500 $m^2$/g, such as at least about any of the following: 800, 900, 1000, 1200, 1400, 1500, 1600, 1800, 2000, 2200, 2400, and 2500 $m^2$/g, and/or at most about any of the following: 3500, 3400, 3200, 3000, 2800, 2600, and 2500 $m^2$/g. In accordance with example embodiments, the surface area may be determined from Brunauer-Emmett-Tellar model analysis of $N_2$ gas adsorption-desorption isotherm at 77K, which is a common method to describe the accessible surface area that a MOF material has. In this regard, nitrogen gas adsorption isotherms are performed on a QUANTACHROME® NOVA® 2200e surface area and porosity analyzer at 77 K. Prior to the tests, all samples are thermally activated overnight at 100° C. under 0.01 mmHg. Helium gas is used to measure the dead space volume prior to measurements. Brunauer-Emmett-Teller (BET) surface areas can be determined by linear least-square fitting of the BET plot, the upper working limits can be provided by the Rouquerol analysis.

In accordance with example embodiments, the MOF material includes a water uptake capacity from about 10 to about 5000 grams (g) of water per kilogram (kg) of MOF material under a relative humidity ranging from 10 to 100%, such as at least about any of the following: 10, 20, 50, 100, 150, 200, 250, 300, 350, 400, 500, 600, 700, 800, 900, 1000, 1500, 2000, and 2500 g of water per kg of MOF material, and/or at most about any of the following: 5000, 4500, 4000, 3500, 3000, 2500, 2000, 1800, 1600, 1500, 1400, 1200, and 1000 g of water per kg of MOF material; wherein the water uptake capacity is determined gravimetrically and the value may be taken from the first cycle adsorption at 70% relative humidity at 22° C. at ambient pressure. Additionally or alternatively, the MOF material may include a working capacity of the MOF material ranges from 2 to 5000 g of water per kg of MOF material, such as at least about any of the following: 2, 5, 10, 20, 50, 100, 150, 200, 250, 300, 350, 400, 500, 600, 700, 800, 900, 1000, 1500, 2000, and 2500 g of water per kg of MOF material, and/or at most about any of the following: 5000, 4500, 4000, 3500, 3000, 2500, 2000, 1800, 1600, 1500, 1400, 1200, and 1000 g of water per kg of MOF material; wherein the working capacity of the MOF material may be defined as the difference between an amount of water adsorbed and desorbed.

The MOF material, in accordance with example embodiments, may have a water desorption percentage from 15 to 100%, such as at least about any of the following: 15, 25, 50, 60, 70, 80, 90, and 95%, and/or at most about any of the following: 100, 99, 98, 97, 96, and 95%. The term "water desorption percentage" refers to the percentage of previously retained water that is released by the sorbent material. For example, is sorbent material captures 1000 grams of water and releases 850 grams of this water during a desorbing operation, then the water desorption percentage would be 85%.

In accordance with example embodiments, the MOF material may include one or more organic linkers, which may independently include either one or more hydrophilic or hydrophobic organic linkers. The one or more organic linkers may include a variety of functional groups, such a of hydroxyl group, a carbonyl group, a carboxyl group, an amino group, a sulfhydryl group, an ether, an ester, or any combination thereof. In accordance with example embodiments, the one or more organic linkers include a hydrophilic linker (or, in an alternative example embodiment consisting of hydrophilic organic linkers) that enhances water's affinity to the MOF material. By way of example only, the one or more hydrophilic organic linkers may include poly(ethylene glycol) functionality, poly(vinyl alcohol) functionality, polyacrylamide functionality, polyglutamic acid functionality, acrylates, methacrylate, or any combinations thereof.

The MOF material, in accordance with example embodiments, may include one or more of the following examples: MOF-303, Al-CAU-10, Al-MIL-160, Cr-MIL-101, Al-Fumarate, Ti-MIL-125, Ti-MIL-125-$NH_2$, (Al, Fe, Cr)-MIL-100, Zr-MOF-801, Zr-MOF-808, Zr-UiO-66, Zr-UiO-66-$NH_2$, Zr-MOF-841, Al-MIL-53, Cu-HKUST-1, Al-CAU-10, Al-MIL-160, and (Zn, Mg, Ni)-MOF-74. In accordance with example embodiments, the MOF material may have covalently bound functionalities to the organic linker, such as Ti-MIL-125 vs Ti-MIL-125-$NH_2$.

In accordance with example embodiments, the MOF material the one or more organic linkers (e.g., one or more hydrophilic organic linkers) have a desorption temperature (e.g., temperature at which the MOF material releases previously captured water) of at least about 30° C., such as at least about any of the following: 30, 40, 50, 60, 70, 80, 90, 100, and 120° C., and/or at most about any of the following: 200, 180, 160, 150, 140, and 120° C.

In accordance with example embodiments, the MOF material may have a bulk density from 0.2 to about 3 $g/cm^3$, such as at least about any of the following: 0.2, 0.4, 0.6, 0.8, 1, 1.2, 1.4, and 1.6 $g/cm^3$, and/or at least about any of the following: 3, 2.8, 2.6, 2.4, 2, 1.8, and 1.6 $g/cm^3$.

Individual MOF materials may have of be formed with unique structural topology and/or chemical functionalities that facilitate improved performance for atmospheric water extraction. For example, Cr-MIL-101 according to an example embodiment demonstrated a water generation rate of 8.9 L/kgMOF/day, which is significantly greater than any previously-reported values for MOF-based atmospheric water extractor. In addition, in an example embodiment, a close to 100% water desorption was achieved at 50° C. in less than 2 hours in most of MOFs evaluated, and as summarized in Table 1 below. The MOF materials, which are summarized in Table 1, were studied with $N_2$ gas for determining water vapor sorption properties. Surface area calculated from Brunauer-Emmett-Teller (BET) model analysis of $N_2$ gas adsorption-desorption isotherm at 77 K as noted above. Pore volume was calculated at $p/p_o$=0.4 of $N_2$ adsorption isotherm (77 K). Water vapor uptake capacity was determined gravimetrically; the value is taken from the first cycle adsorption at 70% RH and 22° C. at ambient pressure. Working capacity was determined gravimetrically by the difference in the amount of water desorbed and adsorbed during water cycle stability and recovery studies.

TABLE 1

| MOF | SA[a] ($m^2 g^{-1}$) | $v_p$[b] ($cm^3 g^{-1}$) | Uptake capacity[c] ($g\ kg^{-1}$) | Working capacity[d] ($g\ kg^{-1}$) | Water desorbed (%) |
|---|---|---|---|---|---|
| Ti-MIL-125 | 1153 | 0.47 | 323 | 313 | 97 |
| Ti-MZL-125-$NH_2$ | 1358 | 0.55 | 413 | 409 | 99 |
| Zr-UiO-66 | 959 | 0.40 | 347 | 338 | 97 |
| Zr-UiO-66-$NH_2$ | 1109 | 0.46 | 364 | 355 | 98 |
| Zr-MOF-808 | 1880 | 0.69 | 744 | 714 | 96 |
| Cr-MIL-101 | 2579 | 1.63 | 1263 | 1246 | 98 |
| Cu-HKUST-1 | 1512 | 0.41 | 218 | 105 | 48 |
| Al-MIL-53 | 814 | 0.41 | 13 | 2 | 15 |
| Zn-ZIF-8 | 1835 | 0.69 | 15 | 6 | 40 |

[a]Surface area calculated from Brunauer-Emmett-Teller (BET) model analysis of $N_2$ gas adsorption-desorption isotherm at 77 K.
[b]Pore volume calculated at $p/p_o$ = 0.4 of $N_2$ adsorption isotherm (77 K.).
[c]Water vapor uptake capacity was determined gravimetrically; the value is taken from the first cycle adsorption at 70% RH and 22° C. at ambient pressure.
[d]Working capacity was determined gravimetrically by the difference in the amount of water desorbed and adsorbed during water cycle stability and recovery studies.

In accordance with example embodiments, the MOF material may include a low relative humidity uptake capacity, such as Al-MOF-303, Al-CAU-10, Al-FUM, Zr-MOF-801, Zr-MOF-841, and COF-432. Additional MOF materials may be configured, as noted above, with specific chemical and topological modifications. For example, existing MOF materials may be modified by, for example, ligand exchange, chemical grafting, and modify metal centers directly to instill water capturing or water attracting features. The addition of more polar features, such as carboxylic acids, and framework-supported ionic liquid may be particularly desirable in accordance with example embodiments. Example modifications are illustrated in Schematic 1 below. For example, examples 1 and 2 in Schematic 1 illustrate modification of inorganic ion/clusters while examples 3-5 illustrate example modifications to organic linkers.

Schematic 1

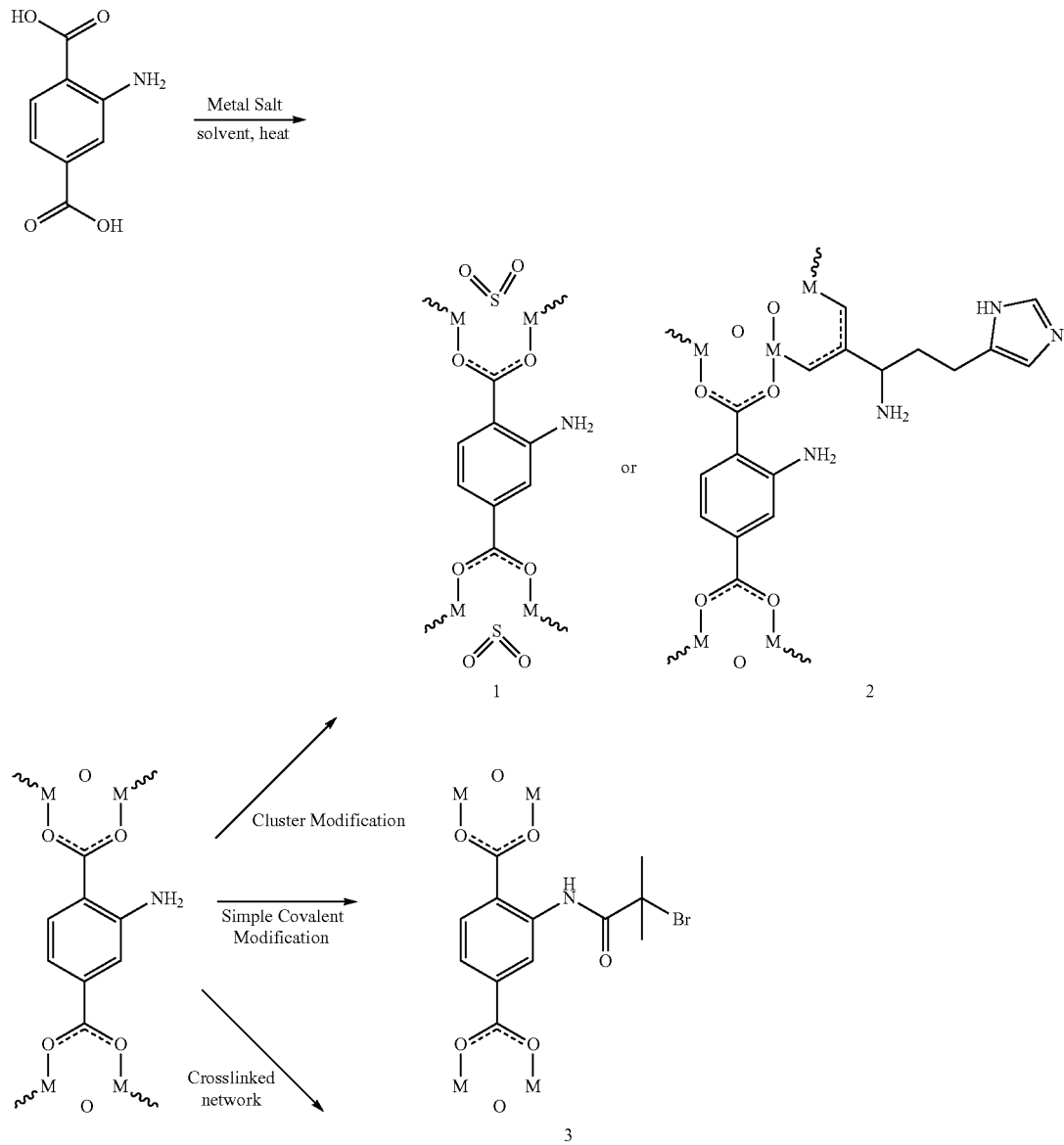

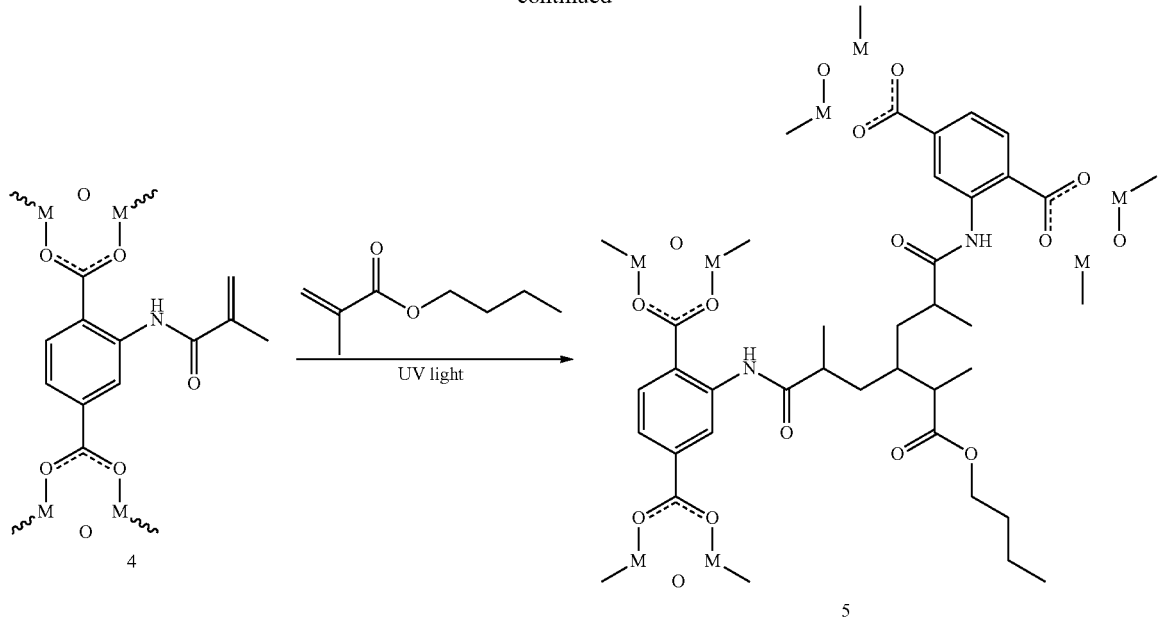

Figure 3:
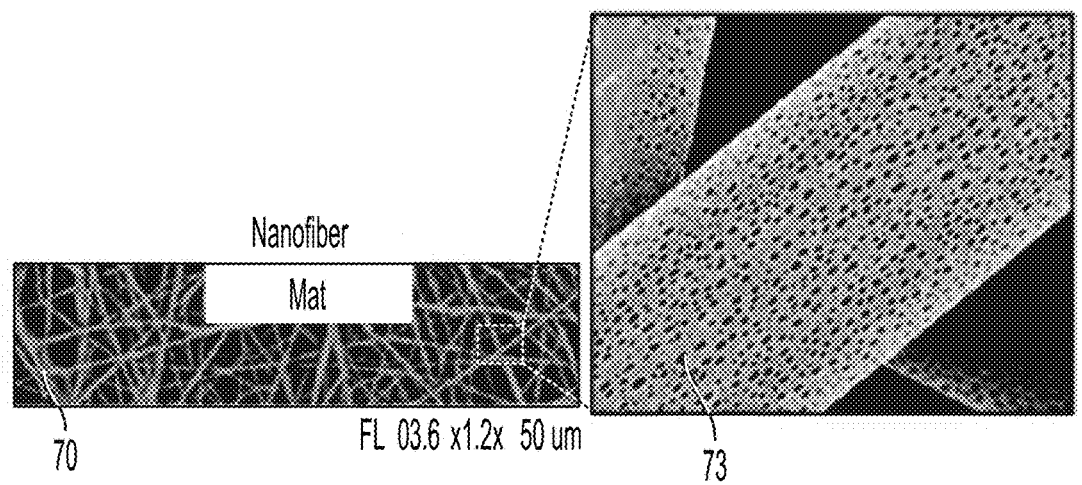
FIG. 3 shows a mat of a plurality of nanofibers including a magnified view of a nanofiber of the mat that illustrates the porous surface area of the nanofibers in accordance with an example embodiment.

As referenced above, the sorbent material may include a hydrogel material provided in the form of nanofibers. In accordance with example embodiments, the nanofibers (or nanofabrics) may be made, for example, by electospinning a hydrogel material (e.g., in a flowable form). The hydrogel-based nanofibers may include macropores, micropores, and/or nano-scaled pores that provide the nanofibers with particularly large surface areas. As such, the nanofibers may be advantageous for atmospheric water extraction applications in accordance with example embodiments. The increased porosity of the nanofibers, for example, provide overall diffusion kinetics that may be further enhanced. FIG. 3, for instance, shows a mat of a plurality of nanofibers 70 including a magnified view of a nanofiber of the mat that illustrates the porous surface area of the nanofibers including a plurality of pores 73 or pits 73 formed in the surface of the nanofibers in accordance with example embodiments.

By way of example only, a hydrogel material may be synthesized for harvesting water from air. Synthesis of super absorbing hydrogels, for example, may be made of imidazolium-derived ionomers copolymerized onto a poly(NIPAM) network. Such hydrogels, for example, may then be subjected to electrospinning to form porous nanofibers (e.g., hydrogel-based nanofibers). In accordance with example embodiments, imidazolium ionomers are a desirable target since ionic liquids such as 1-ethyl-3-methyl-imidazolium acetate (EMIM-Ac) perform well as a sorbent, even at relatively low (20%) relative humidity. As noted above, the nanofibers including a hydrogel material completely eliminates the need for large amounts of lithium salts. In accordance with example embodiments, for example, the nanofibers including (or, in an alternative example embodiment consisting of) the hydrogel material may be devoid of lithium salts.

By way of example only, a hydrogel material may be synthesized from imidazolium-derived ionomers as the water adsorbing units with vinylimidazoles as illustrated in Schematic 2. These imidazolium ionomers are easily synthesizable and structurally modular, which allows for quick access. Notably, the addition of anionic carboxylates improves the sorption of moisture, in accordance with example embodiments, thus increasing the volume and rate of moisture collected without the need of lithium salts. Lastly these example ionomers can be copolymerized with poly(N-isopropylacrylamide) (NIPAM) to utilize the thermally-activated water-release actuation of poly(NIPAM). With a Lower Critical Solution Temperature (LCST) of 32° C. and a high swell ratio, poly(NIPAM) is an ideal matrix hydrogel in accordance with example embodiments.

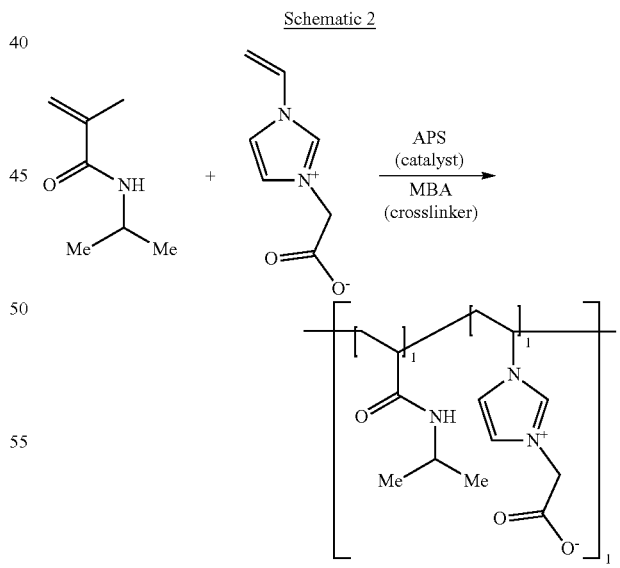

In accordance with example embodiments, the plurality of nanofibers may include a hydrogel material, as noted above, and the plurality of nanofibers may have an average diameter from about 0.5 nm to about 1000 nm, such as at least about nay any of the following: 0.5, 1, 5, 10, 20, 30, 40, 50, 60, 70, 80, 90, 100, 125, 150, 175, 200, 300, 400, and 500 nm, and/or at most about any of the following: 1000, 900, 800, 700, 600, and 500 nm. The plurality of nanofibers, for example, may include continuous fibers, discontinuous fibers, or a combination thereof. In accordance with example embodiments, the plurality of nanofibers may be provided in a non-consolidated format (e.g., loosely laid fibers that are not physically entangled or otherwise bonded to form a fabric), provided as a woven fabric, or provided as a non-woven fabric. Additionally or alternatively, the plurality of nanofibers may include electrospun, melt spun, and/or solution spun fibers.

In accordance with example embodiments, the plurality of nanofiber includes discontinuous fibers having an average length from about 5 centimeters (cm) to about 500 cm, such as at least about any of the following: 5, 10, 25, 50, 75, 100, 125, 150, 175, 200, 225, and 250 cm, and/or at most about any of the following: 500, 450, 400, 350, 300, and 250 cm.

In accordance with example embodiments, and as noted above, at least a portion of the plurality of nanofibers include a plurality of pores (or effective pores) along a respective surface, throughout a respective thickness, or a combination thereof. The plurality of pores (or effective pores), for example, may include an average diameter from about 0.5 to about 1000 nm, such as at least about any of the following: 0.5, 1, 5, 10, 20, 40, 50, 60, 80, 100, 120, 140, 150, 200, 225, 250, 275, 300, 350, 400, 450, and 500 nm, and/or at most about any of the following: 1000, 900, 800, 700, 600, and 500 nm.

In accordance with example embodiments, the plurality of nanofibers may have an average surface area from 500 g/m$^2$ to 5000 g/m$^2$, such as at least about any of the following: 500, 600, 800, 1000, 1500, 2000, and 2500 g/m$^2$, and/or at most about any of the following: 5000, 4500, 4000, 3500, 3000, and 2500 g/m$^2$.

The plurality of nanofibers, in accordance with example embodiments, may have a water uptake capacity from about 0.1 to about 10 grams of water per gram of the plurality of nanofibers, such as at least about any of the following: 0.1, 0.3, 0.5, 0.7, 1, 1, 1.5, 2, 2.5, 3, 3.5, 4, 4.5, and 5 grams of water per grams of the plurality of nanofibers, and/or at most about any of the following: 10, 9.5, 9, 8.5, 8, 7.5, 7, 6.5, 6, 5.5, and 5 grams of water per grams of the plurality of nanofibers. Additionally or alternatively, the plurality of nanofibers may have a working capacity from 0.1 to 50 grams of water per gram of the plurality of nanofibers, such as at least about any of the following: 0.1, 1, 3, 5, 8, 10, 12, 15, 18, 20, 22, and 25 grams of water per gram of the plurality of nanofibers, and/or at most about any of the following: 50, 48, 45, 42, 40, 38, 35, 32, 30, 28, and 25 grams of water per gram of the plurality of nanofibers.

In accordance with example embodiments, the hydrogel material may include a polyvinyl alcohol functionality, a polyethylene glycol functionality, an acrylate functionality, imidazole or imidazolium functionality, N-vinyl imidazole and derivatives thereof, an ionomer, collagen, gelatin, fibrin, or any combination thereof. Additionally or alternatively, the hydrogel material includes poly(ethylene glycol) functionality, poly(vinyl alcohol) functionality, polyacrylamide functionality, polyglutamic acid functionality, acrylates, methacrylate, or any combinations thereof. Additionally or alternatively, the hydrogel material includes a copolymer of an acrylamide functional monomer and an imidazolium functional ionomer with an optional diacrylamide crosslinker, such as but not limited to N,N'-Methylenebisacrylamide. Additionally or alternatively, the hydrogel material may include one or more deliquescent salts, such as CaCl$_2$) or LiCl or both. In accordance with example embodiments, the hydrogel material may be devoid of one or more deliquescent salts.

As noted above, the plurality of nanofibers attract and/or retain (e.g., adsorbs) water from air at a first temperature and/or a first pressure, and releases water at a second temperature and/or pressure, in which the first temperature is less than the second temperature and/or the first pressure is larger than the second pressure.

In accordance with example embodiments, the hydrogel material may have a desorption temperature of at least about (e.g., temperature at which the MOF material releases previously captured water) of at least about 30° C., such as at least about any of the following: 30, 40, 50, 60, 70, 80, 90, 100, and 120° C., and/or at most about any of the following: 200, 180, 160, 150, 140, and 120° C. Additionally or alternatively, the plurality of nanofibers are provided in the form of a fabric (e.g., nanofabric) having an areal density ranging from 1 gram per square meter (gsm) to 200 gsm, such as at least about any of the following: 1, 5, 10, 20, 30, 40, 50, 60, 70, 80, 90, and 100 gsm, and/or at most about any of the following: 200, 180, 160, 140, 120, and 100 gsm.

In accordance with example embodiments, the sorbent material may include a particulate-composite material (PCM) including (i) a binder material and (ii) the MOF and/or the plurality of nanofibers. The binder material, for example, may include a natural polymeric material, a synthetic polymeric materials, a wax, or any combination thereof. Additionally or alternatively, the binder material may include a homopolymer including, for example, polyvinylidene fluoride (PVDF), carboxymethyl cellulose (CMC), polyvinyl alcohol (PVA), poly(acrylic acid) (PAA), silicone based resins, or combinations thereof. Additionally or alternatively, the binder material may include a copolymer including a styrene-butadiene rubber (SBR), acrylics, methacrylic, maleic, or itaconic acid as a comonomer. Additionally or alternatively, the binder material may include both a linear and a three-dimensional crosslinked polymer.

In accordance with example embodiments, the PCM may have an average diameter from about 1 mm to about 10 mm, such as at least about any of the following: 1, 2, 3, 4, 5, and 6 mm, and/or at most about any of the following: 10, 9, 8, 7, and 6 mm.

In accordance with example embodiments, the PCM may have a binder-to-sorbent ratio (grams of binder/grams of sorbent) of from 1:10 to 10:1, such as at least about any of the following: 1:10, 2:10, 3:10, 4:10, 5:10, 6:10, 7:10, 8:10, 9:10, and 1:1, and/or at most about any of the following: 10:1, 9:1, 8:1, 7:1, 6:1, 5:1, 4:1, 3:1, 2:1, and 1:1.

In accordance with example embodiments, the PCM may include a surface having a first concentration of the sorbent material and a central body portion having a second concentration of the sorbent material, wherein the central body portion is surrounded by the surface and the first concentration is greater than the second concentration. Additionally or alternatively, the PCM may have a bulk density from 0.05 to about 2 g/cm$^3$, such as at least about any of the following: 0.05, 0.08, 0.1, 0.2, 0.4, 0.5, 0.6, 0.8 and 1 g/cm$^3$, and/or at most about any of the following: 2, 1.8, 1.6, 1.5, 1.4, 1.2, and 1 g/cm$^3$.

In accordance with example embodiments, the sorbent material may include one or more MOF material and one or more hydrogel-based nanofibers (either alone or as part of a PCM) that may be packed within one or more adsorption columns. For example, a first adsorption column may include one or more MOF materials (alone or as part of a PCM) and a second adsorption column may include one or more hydrogel-based nanofibers (alone or as part of a PCM). Additionally or alternatively, an adsorption column may include the combination of one or more MOF material (alone or as part of a PCM) and one or more hydrogel-based nanofibers (alone or as part of a PCM). As described in more detail below, water harvesting devices in accordance with example embodiments may include a first set of adsorption columns including one or more MOF materials for extracting water from low moisture air and a second set of adsorption columns including hydrogel-based nanofibers for extracting water from high moisture air. For example, once the atmospheric moisture is concentrated to a high moisture level during the TSA process or PSA process, the humid air may then brought into contact with a condenser (e.g., a thermoelectric Peltier device) for water collection. A super-hydrophobic coating (contact angle >150°) may be applied to the condensing side of the Peltier device, facilitating the coalescing and sliding of water droplets leading to high water collection efficiency In accordance with example embodiments, and as will be shown and described in greater detail below, a water harvesting device may include at least a first adsorption (TSA or PSA) column and a second adsorption (TSA or PSA) column, in which the first adsorption column (e.g., a TSA or PSA column) includes a first inlet, a first outlet, and a first interior region, in which the first interior region houses, for example, one or more MOF materials. The second adsorption column (e.g., a TSA or PSA column) includes a second inlet, a second outlet, and a second interior region, in which the second interior region houses, for example, one or more plurality of nanofibers. The water harvesting device itself may include an air inlet and an air outlet, in which the air inlet may be selectively and operatively coupled to both the first inlet and the second inlet, and the air outlet being selectively and operatively coupled to both the first outlet and the second outlet. In accordance with example embodiments, the water harvesting device may include at least one incoming airflow valve located between the first and second adsorption columns and the air inlet, in which the at least one incoming airflow valve may be configured to allow ambient air from an environment into the first adsorption column and/or the second adsorption column. The at least one incoming airflow valve may include a three-way valve. Additionally or alternatively, the at least one incoming airflow valve may include a first incoming airflow valve located between the first adsorption column and the air inlet and a second incoming airflow valve located between the second adsorption column and the air inlet of the water harvesting device.

In accordance with example embodiments, the water harvesting device may include an air intake apparatus (e.g., a fan) located between and operatively connected to the air inlet of the water harvesting device and the at least one incoming airflow valve. The water harvesting device may also include at least one exiting airflow valve located between the first and second adsorption columns and the air outlet of the water harvesting device, in which the at least one exiting airflow valve may be configured to allow removal of air from the first and/or second adsorption columns to the environment. In accordance with example embodiments, the at least one exiting airflow valve may include a three-way valve. Additionally or alternatively, the at least one exiting airflow valve may include a first exiting airflow valve located between the first adsorption column and the air outlet of the water harvesting device and a second exiting airflow valve located between the second adsorption column and the air outlet of the water harvesting device.

Figure 4:
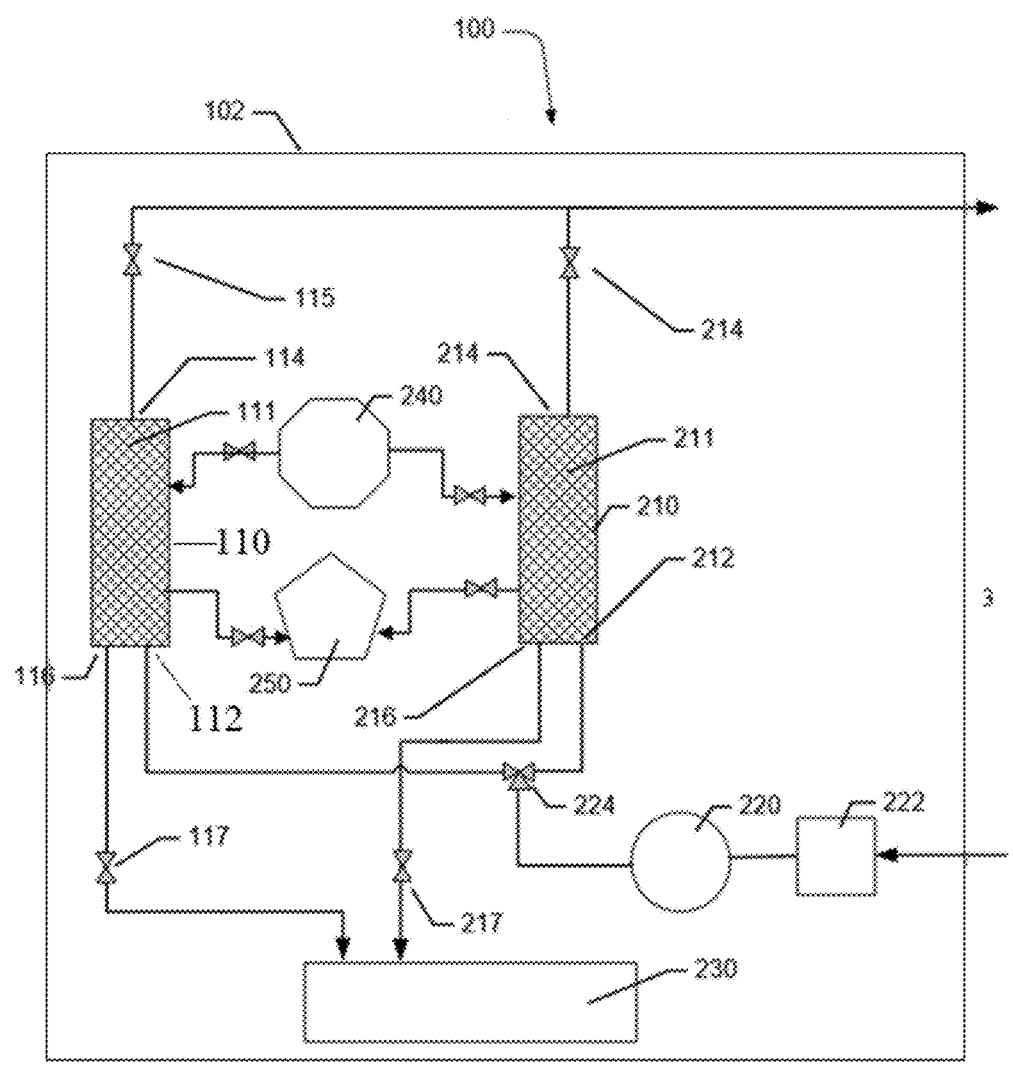
FIG. 4 illustrates a water harvesting device including a plurality of absorption columns, in which a first absorption column captures water from air while a second absorption column releases previously-captured water in accordance with an example embodiment.

FIG. 4, for example, more particularly illustrates a water harvesting device 100 including a plurality of absorption columns 110, 210 (e.g., TSA or PSA columns), in which a first absorption column 110 is configured to capture water from air while a second absorption column 210 is configured to release previously captured water in accordance with example embodiments. The water harvesting device 100 of FIG. 4 includes an outer housing 102 in which the adsorption columns 110, 210 and other items are housed. Atmospheric air 3 may be pulled into the water harvesting device 100 via an air intake apparatus 200 (e.g., a fan 220) and conveyed into the first adsorption column 110 through an incoming air flow valve 224 (e.g., a three-way valve 224 configured such that incoming air can be directed to either adsorption column 110, 210) and an inlet 112. Optionally and as shown on FIG. 4, the water harvesting device 100 may include a pre-filter 222 positioned between the air intake apparatus 220 and the air inlet of the water harvesting device 100. The airflow passes through the first adsorption column 110, which includes a first sorbent material 111 therein, and exits the first adsorption column 110 through an outlet 114 where the airflow may be expelled out of the water harvesting device 100 via a valve 115. In accordance with example embodiments, the first adsorption column 110 captures or retains water from the airflow passing therethrough under a first set of operating conditions, while the second adsorption device 210 operates under a second set of operating conditions to desorb or releases water (e.g., liquid water and/or high humidity air). In this regard, the adsorption columns 110, 210 may be either TSA columns or PSA columns. Accordingly, each adsorption column 110, 210 is operatively connected to a heat source 240 for TSA columns and/or a vacuum source 250 for PSA columns. The second adsorption column 210, which includes a second sorbent material 211 therein, also includes an air inlet 212 and an air outlet 214 whereby the airflow that has passed through the second adsorption column 210 may be expelled out of the water harvesting device 100 via a valve 214. In accordance with example embodiments, the second adsorption column 210 may be in an operational state of desorbing while the first adsorption column 110 is an operational state of adsorbing water. In this regard, the water (e.g., liquid or high humidity air) being released from the second sorbent material 211 may exit the second adsorption column 210 via a water outlet 216 and pass directly or indirectly into a liquid water collection component 230. In this regard, a valve 217 may be located between the liquid water collection component 230 and the water outlet 216.

As will be shown and described in greater detail below, in accordance with alternative example embodiments, a water harvesting device may include a piping network and/or a valve network that may be selectively controlled to pass ambient air from the environment through a first adsorption column only, a second adsorption column only, both a first adsorption column and a second adsorption column in parallel, or both a first adsorption column and then a second adsorption column in series. For example, the water harvesting device may include a device airflow path from the air inlet of the water harvesting device, into and through a first adsorption column, into and through a second adsorption column, and out the air outlet of the water harvesting device to provide a series configuration. In accordance with example embodiments, the at least one adsorption column includes at least a first adsorption column and a second adsorption column, in which each adsorption column includes a respective inlet, a respective outlet, and a respective interior region. For instance, the first adsorption column may include a first interior region and the second adsorption column may include second interior region in which each interior regions include one or more MOF materials, a plurality of hydrogel-based nanofibers, PCMs, or any combination thereof. In this regard, the water harvesting device may include an air inlet and an air outlet, in which the air inlet may be selectively and operatively coupled to both the first inlet and the second inlet, and the air outlet may be selectively and operatively coupled to both the first outlet and the second outlet. For example, the water harvesting device may include at least one incoming airflow valve located between the first and second adsorption columns and the air inlet, in which the at least one incoming airflow valve being configured to allow ambient air from an environment into the first adsorption column and/or the second adsorption column. In accordance with example embodiments, the at least one incoming airflow valve includes a three-way valve. Additionally or alternatively, the at least one incoming airflow valve includes a first incoming airflow valve located between the first adsorption column and the air inlet and a second incoming airflow valve located between the second adsorption column and the air inlet. The water harvesting device may also include an air intake apparatus located between and operatively connected to the air inlet and the at least one incoming airflow valve. The water harvesting device may also include at least one exiting airflow valve located between the first and second adsorption columns and the air outlet, in which the at least one exiting airflow valve may be configured to allow removal of air from the first and/or second adsorption columns to the environment. In accordance with example embodiments, the at least one exiting airflow valve includes a three-way valve. Additionally or alternatively, the at least one exiting airflow valve includes a first exiting airflow valve located between the first TSA column and the air outlet and a second exiting airflow valve located between the second TSA column and the air outlet. In accordance with example embodiments, the water harvesting device may include a valve network that allows for selective directional control of ambient air from the environment to pass through the first adsorption column only, the second adsorption column only, both the first adsorption column and the second adsorption column in parallel, or both the first adsorption column and the second adsorption column in series.

Figure 5A:
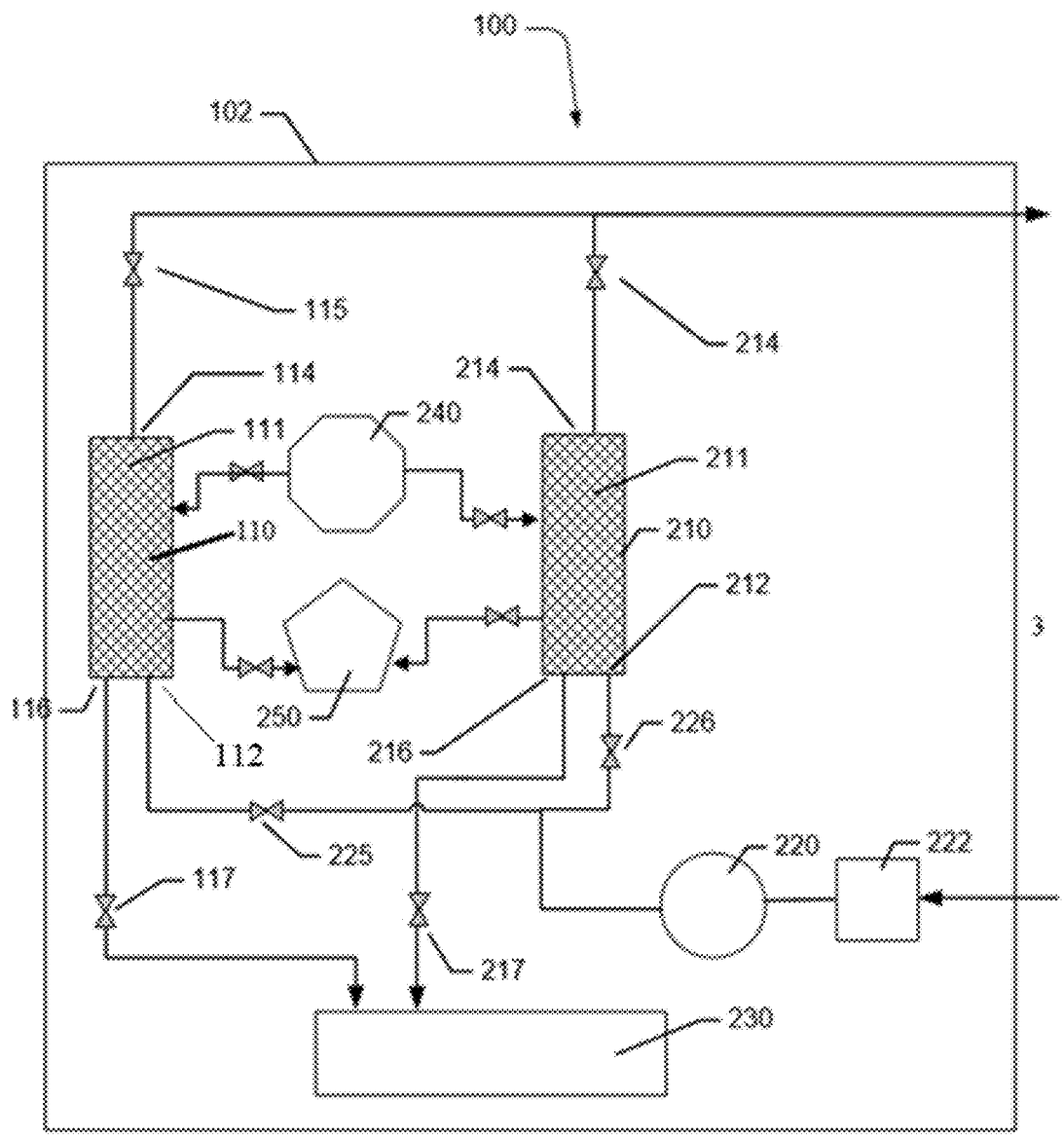
FIG. 5A illustrates a water harvesting device configured with absorption columns that may be operated in parallel (e.g., each adsorption column captures water at the same time and/or releases previously captured water at the same time), or one adsorption column may be operated in a different state than another adsorption column (e.g., a first adsorption column may be actively capturing water from air while a second adsorption column may be desorbing water or be shut down) in accordance with an example embodiment.

FIG. 5A, for example, specifically illustrates a water harvesting device configured with absorption columns that may be operated in parallel (e.g., each adsorption column captures water at the same time and/or releases previously captured water at the same time), or one adsorption column may be operated in a different state than another adsorption column (e.g., a first adsorption column may be actively capturing water from air while a second adsorption column may be desorbing water or be shut down) in accordance with example embodiments. In this regard, a water harvesting device 100 shown in FIG. 5A includes a first inlet valve 225 to a first adsorption column 110 and a second inlet valve 226 to a second adsorption column 210, in which the inlet valves 225, 226 may be controlled in a manner to direct incoming airflow to both adsorption columns (110 and 210) at the same time (e.g., parallel operation) or to only one adsorption column (110 or 210) for water harvesting while the other adsorption column (110 or 210) operates in a desorbing state in which previously retained or capture water may be released from associated sorbent material 11, 211 and directed into a liquid water collection component 230. In this regard, water being desorbed from the sorbent material 111 from the first adsorption column 110 may exit the first adsorption column 110 via a water outlet 116 while a valve 117 may be opened to allow passage of the released water to the liquid water collection component 230. In a similar manner, water being desorbed from the sorbent material 211 from the second adsorption column 210 may exit the second adsorption column 210 via a water outlet 216 while a valve 217 may be opened to allow passage of the released water to the liquid water collection component 230.

Figure 5B:
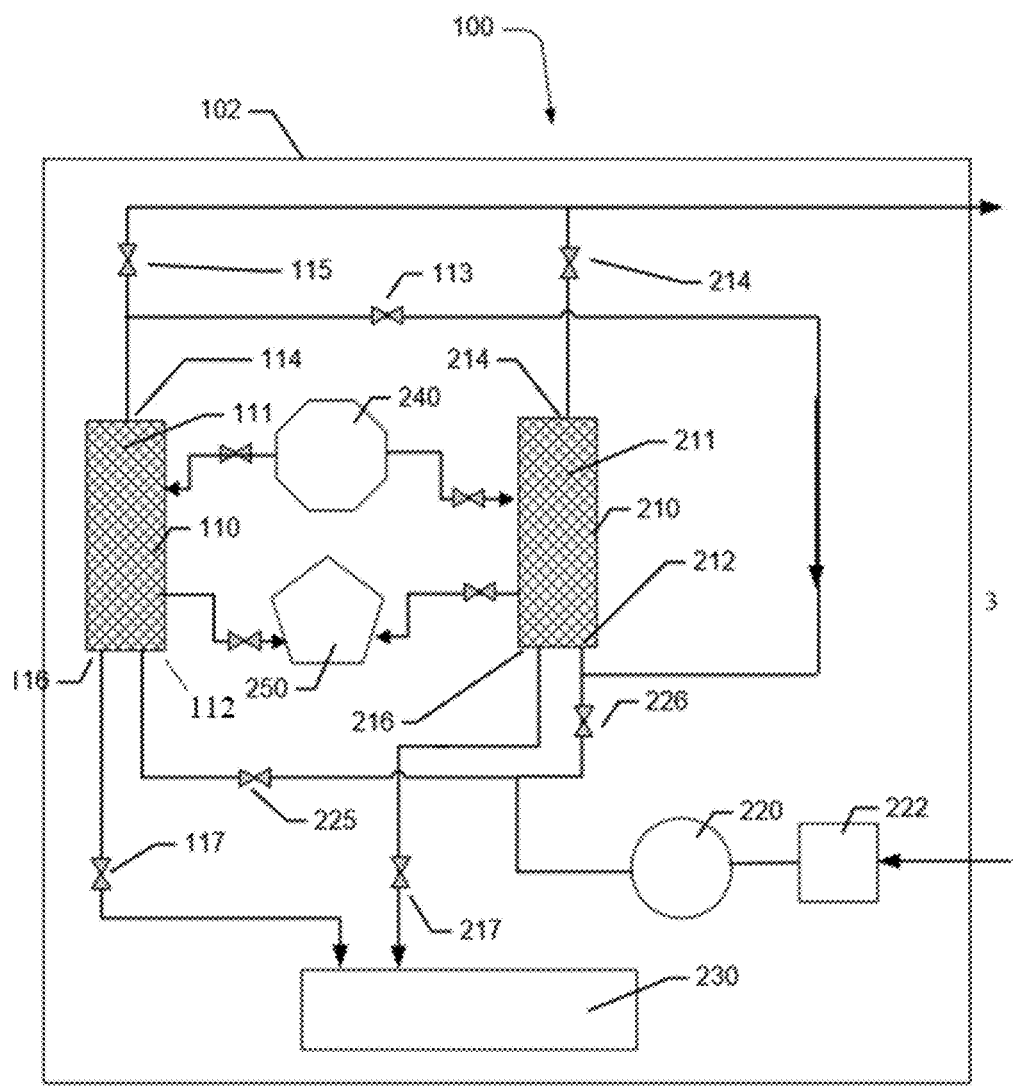
FIG. 5B illustrates a water harvesting device similar to FIG. 5A, but also including a configuration to enable series operation of the adsorption columns (e.g., incoming air may pass through a first adsorption column, then to a second adsorption column, and then exit the device) in accordance with an example embodiment.

FIG. 5B further illustrates a water harvesting device similar to as shown in FIG. 5A and described above, but further including a configuration to enable series operation of the adsorption columns (e.g., incoming air passes through a first adsorption column, then to a second adsorption column, and then exits the device). In this regard, in the water harvesting device 100 illustrated by FIG. 5B, incoming air is passed through the valve 225, and into the first adsorption column 110, and then exits the first adsorption column 110 via the outlet 114 as described above with reference to FIG. 5A. As shown in FIG. 5B, however, a valve 113 may be opened while valve the 115 is in a closed position, to channel the airflow into the inlet 212 of the second adsorption column 210. The airflow thus passes through the second adsorption column 210, exits via the outlet 214 thereof, and is expelled from the water harvesting device 100 through the valve 214, which is open. In accordance with example embodiments, the first sorbent material 111 may include a plurality of hydrogel-based nanofibers and the second sorbent material 211 may include one or more MOF materials.

As noted above and as will be shown and described in greater detail below, the adsorption columns in the water harvesting device may be operatively connected to a heating source (e.g., heating device) configured to directly or indirectly supply heat to the at least one TSA column. For example, the heating source may be operatively and independently connected to the first TSA column and the second TSA column, such that the heating source can provide heat to the first TSA column to initiate and/or perform a desorption process for the first TSA column while the second TSA column actively captures water from an air source (e.g., an adsorption operating state). Additionally or alternatively, the adsorption columns may be operatively connected to a vacuum source configured to reduce the pressure of the interior region of PSA columns. For example, the vacuum source may be operatively and independently connected to the first PSA column and the second PSA column, such that the vacuum source can reduce the pressure within the first PSA column to initiate and/or perform a desorption process for the first PSA column while the second PSA column actively captures water from an air source (e.g., an adsorption operating state).

In accordance with example embodiments, the water harvesting device may include a desorption fluid removal apparatus independently and operatively connected to the first adsorption column and the second adsorption column. The desorption fluid removal apparatus may be located between (i) a respective liquid water outlet of the first adsorption column and the second adsorption column and (ii) a liquid water collection component. The desorption fluid removal apparatus may include a condenser located between the water outlets of the adsorption columns and the liquid water collection component. In accordance with example embodiments, the water harvesting device may include a UV source oriented to expose any liquid water located in the liquid water collection component to UV light and purifying any liquid water collected. In accordance with example embodiments, the water harvesting device may include at least one power source. For example, the at least one power source may be operatively connected to one or more of the air intake apparatus, the desorption fluid removal apparatus (e.g., a fan), the at least one heating apparatus, the at least one vacuum source, and the UV source.

Figure 6:
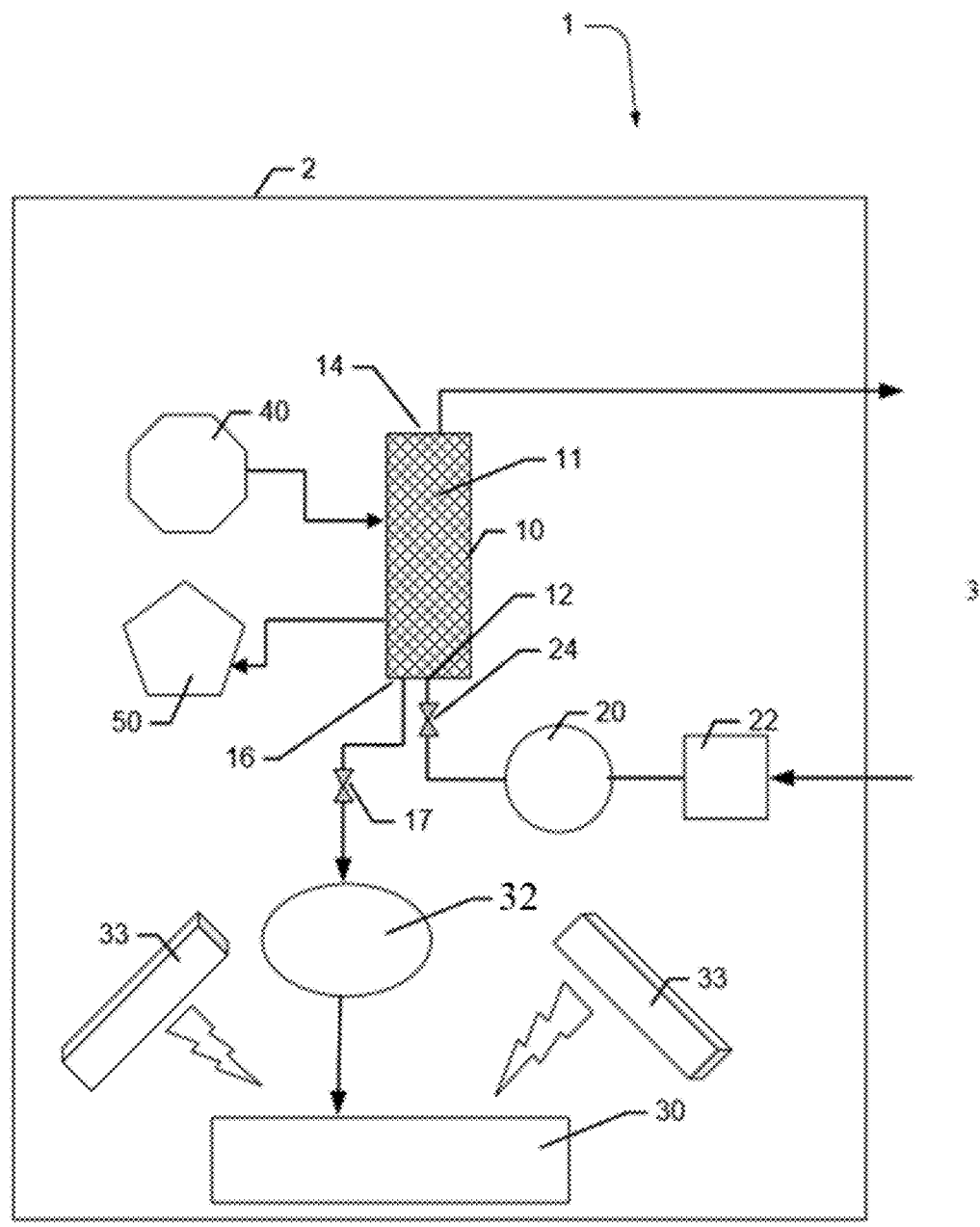
FIG. 6 illustrates a water harvesting device including a condenser and ultraviolet emitting devices in accordance with an example embodiment.

FIG. 6, for example, more specifically illustrates a water harvesting device 1 including a condenser 32 and ultraviolet emitting devices 33 in accordance with example embodiments. Although FIG. 6 illustrates these components in combination with a single adsorption column 10, a plurality of adsorption columns 10 may be operatively connected to one or more condensers 32 that direct water to one or more liquid water collection components 30.

In accordance with example embodiments that will be shown and described in greater detail below, the water harvesting device 1 may include a first sub-system including a first plurality of adsorption columns and a second sub-system including a second plurality of adsorption columns. For instance, the first sub-system may include a first adsorption column and a second adsorption column while the second sub-system may include a third adsorption column and a forth adsorption column. In accordance with example embodiments, the first adsorption column and the second adsorption column may each include one or more MOF materials, and the third adsorption column and the fourth adsorption column may each include a plurality of hydrogel-based nanofibers. The water harvesting device may include a system network of valves that allows for selective directional control of ambient air from the environment to pass through the first sub-system and/or the second sub-system. For instance, the first sub-system may be selected for operation in more arid environments, while the second sub-system may be selected for operation in more humid environments. In this regard, the water harvesting device may include a user interface configured to initiate operation of the first sub-system or the second sub-system. Alternatively, the water harvesting device may include the first sub-system in which the first adsorption column includes a plurality of hydrogel-based nanofibers and the second adsorption column includes one or more MOF materials. Additionally, the second sub-system may include a third adsorption column having a plurality of hydrogel-based nanofibers and a fourth adsorption column including one or more MOF materials. In this regard, each of the sub-systems may be operated independently from the other. The plurality of adsorption columns within each sub-system may be configured to operate in parallel or series operation. When configured in parallel operation, the adsorption columns may include the same type of sorbent material (e.g., all include one or more MOF materials, or all including one or more hydrogel-based nanofibers), while when in series operation the first adsorption column may include one or more hydrogel-based nanofibers and the second adsorption column may include one or more MOF materials.

Figure 7:
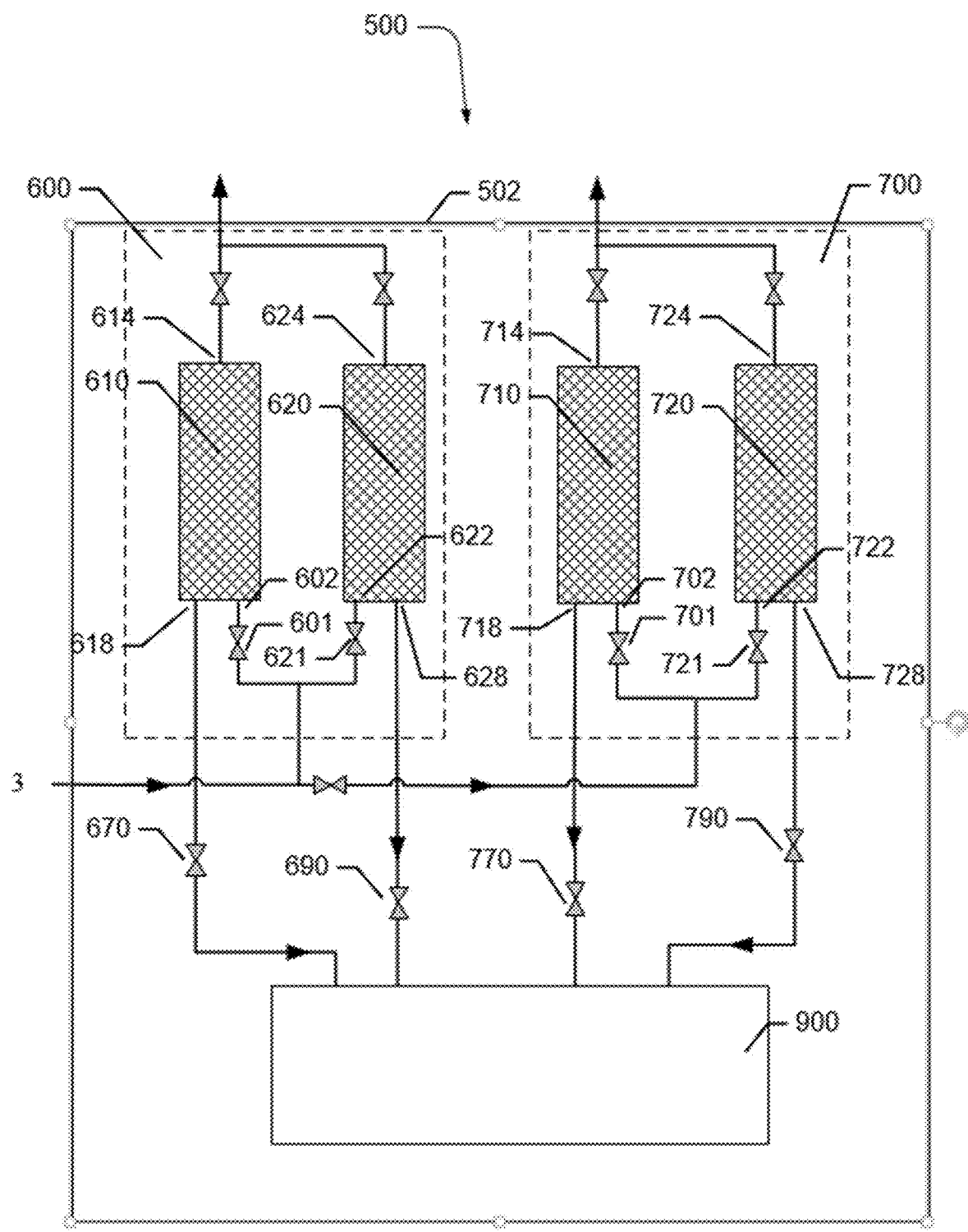
FIG. 7 illustrates a water harvesting device including a plurality of sub-systems, in which each sub-system includes a plurality of absorption columns that may be operated in parallel, that may be operated in parallel or one sub-system may be actively capturing water while another sub-system may be desorbing previously captured water in accordance with an example embodiment.

FIG. 7 illustrates in greater detail a water harvesting device 500 including a plurality of sub-systems, including a first sub-system 600 and a second sub-system 700, in which each sub-system 600, 700 includes a plurality of absorption columns that may be operated in parallel. More specifically, for example, adsorption columns 610, 620 of the first sub-system 600 may be operated in a water capturing or retaining operational state, while the second sub-system 700's adsorption columns 710, 720 are operated in a desorption operation state in which previously captured water is released. As illustrated in FIG. 7, the water harvesting device 500 may include an outer housing 502 that contains the sub-systems 600, 700, for example, therein. Atmospheric air 3 is pulled into the water harvesting device 500 (as previously noted) and may be directed to the first sub-system 600. The opening of valves 601, 621 allow airflow into the first adsorption chamber 610, which includes a first sorbent material, and the second adsorption chamber 620, which includes a second sorbent material (the first and second sorbent materials are similar to as previously shown and described herein). The airflow passes through the adsorption chambers 610, 620 while water is extracted from the airflow. The airflow exits the first adsorption chamber 610 via outlet 614 and exits the water harvesting device 500, and the airflow exits the second adsorption chamber 620 via outlet 624 and exits the water harvesting device 500. In this regard, the first adsorption chamber 610 includes a first water outlet 618 that enables desorbed water to leave the first adsorption chamber 610 when valve 670 is opened. During active capturing of water, however, valve 670 remains in a closed position. In this regard, the second adsorption chamber 620 includes a second water outlet 628 that enables desorbed water to leave the second adsorption chamber 620 when valve 690 is opened. During active capturing of water, however, valve 690 remains in a closed position. While the first sub-system 600 is actively capturing water, the second sub-system 700 may be actively desorbing or releasing water previously captured. During the desorbing or water releasing state, valves 701 and 721 remain closed to ensure that external airflow (e.g., the atmospheric air 3) does not enter into a third adsorption column 710 and a fourth adsorption column 720 via inlets 718 and 728. Although the third and fourth adsorption columns 710,720 include airflow outlets 714, 724, passage of airflow through these outlets 714, 724 may be prevented during the desorption or water releasing operational state. The third adsorption column 710 includes a third water outlet 718, which enables released water to exit the third adsorption column 710 when valve 770 is open, and the fourth adsorption column 720 includes a fourth water outlet 728, which enables released water to exit the fourth adsorption chamber 720 when valve 790 is open. The released water exiting the third adsorption column 710 and the fourth adsorption column 720 may be channeled to a liquid water collection component 900. For sake of simplicity, FIG. 7 does not show an air intake apparatus, a heat source, a vacuum source, or a condenser as described above and illustrated in other figures. It should be noted that one or more of these features can be included in the water harvesting device illustrated by FIG. 5A, for example.

Figure 8:
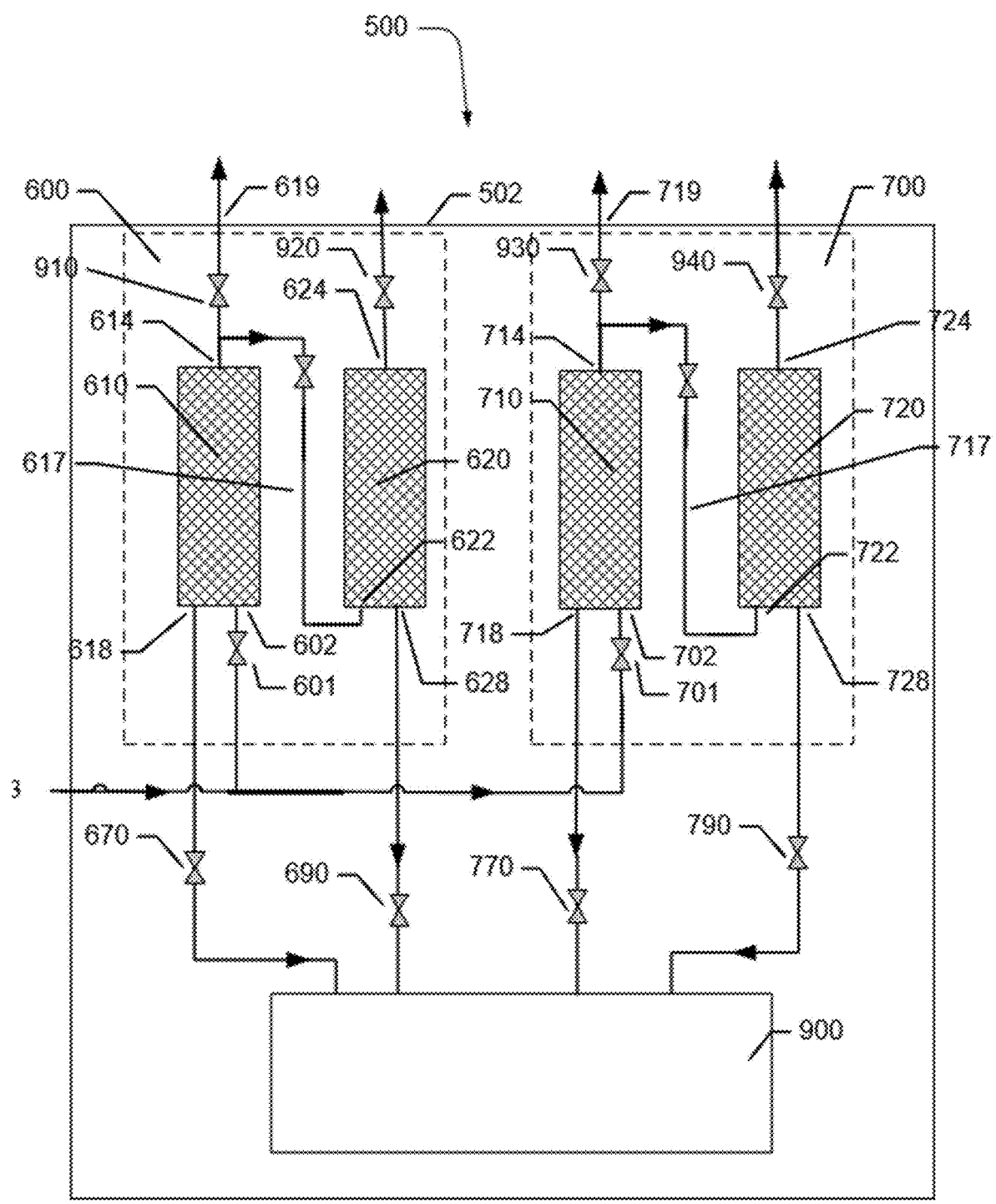
FIG. 8 illustrates a water harvesting device similar to FIG. 7, where the absorption columns with each sub-system may be operated in series in accordance with an example embodiment.

FIG. 8 illustrates a water harvesting device similar to FIG. 7, but the absorption columns within each sub-system may be operated in series in accordance with example embodiments. For example, valve 910 of the first sub-system 600 may be closed to force the airflow exiting the first adsorption chamber 610 to the air inlet 622 of the second adsorption chamber 620. After passing through the second adsorption chamber 620, the airflow may be expelled from the water harvesting device by opening valve 920. The second sub-system 700 may have a similar configuration, in which valve 930 remains closed to force the airflow exiting the third adsorption column 710 to enter the fourth adsorption column 720 via air inlet 722. After passing through the fourth adsorption chamber 720, the airflow may be expelled from the water harvesting device by opening valve 940.

Figure 9:
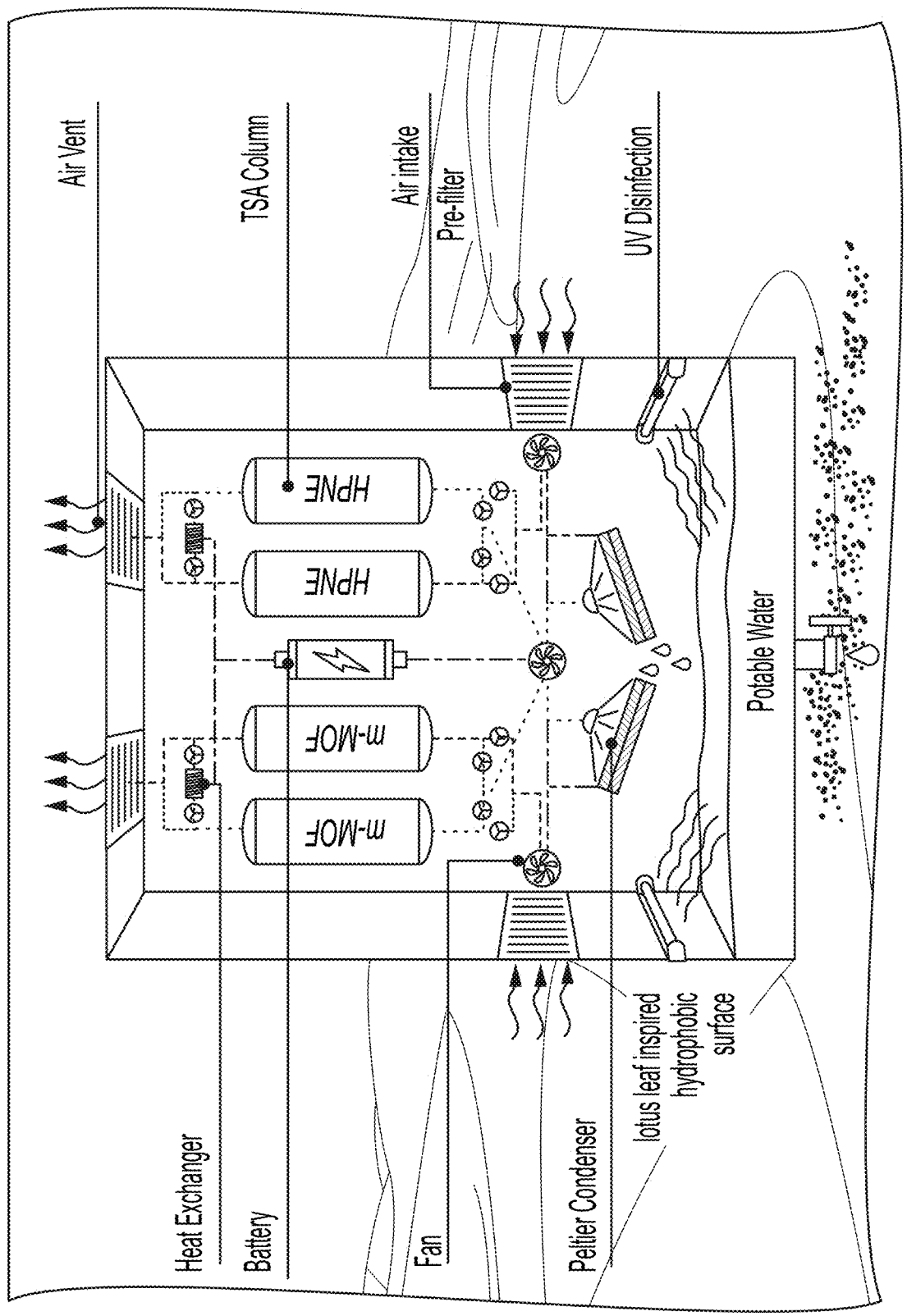
FIG. 9 illustrates a labeled schematic of a water harvesting device in accordance with an example embodiment.

FIG. 9 illustrates a labeled schematic of a water harvesting device in accordance with example embodiments. The water harvesting device illustrated by FIG. 9, for example, illustrates air intake pre-filters two sets of adsorption columns, a battery as a heater source for effectuating a TSA process. FIG. 9 also illustrates a power source (e.g., a battery) operatively connected to a plurality of air intake apparatuses (e.g., fans) as well as a desorbing air-removal apparatus (e.g., a fan) that can facilitate pulling water and/or moist air out of the adsorption columns during a desorbing process. FIG. 9 illustrates that the desorbing air-removal apparatus directs the release water and/or moist air from the adsorption columns to a condenser prior to being collected as potable liquid water for use (e.g., consumption).

In one example embodiment, a method of harvesting water from air is provided. More specifically, the method may include providing a water harvesting device, in which the water harvesting device includes at least one adsorption column (e.g., a TSA column and/or a PSA column) having a sorbent material located within an interior region of the at least one adsorption column. The sorbent material may include (a) a porous media including a metal organic framework (MOF) material including a plurality of metal ions or clusters of metal ions coordinated to one or more organic linkers, (b) a hydrogel-based nanofabric material, or (c) the combination of (a) and (b). In accordance with certain embodiments, the method may include initiating intake of air from an environment into the device and retaining water on or within the sorbent material. The method may also include releasing at least a portion of the water retained by the sorbent material by directly or indirectly increasing the temperature of the sorbent material and/or reducing the pressure within the at least one adsorption chamber. The method may also include collecting the portion of water. In accordance with example embodiments, the water harvesting device used in accordance with methods of harvesting water from air may include any water harvesting device as described and disclosed herein.

In accordance with example embodiments, the method may include retaining water within or on the plurality of hydrogel-based fibers when the relative humidity of the air from the environment is above 30%, such as at least about any of the following: 30, 40, 50, 60, 70, 80, and 90%, and/or at most about any of the following: 100, 95, 90, 85, and 80%. Additionally or alternatively, the method may include retaining water within one or more MOF material when the relative humidity of the air from the environment is below 30%, such as at least about any of the following: 5, 10, 15, 20, and 25%, and/or at most about any of the following: 30, 25, AND 20%.

In accordance with example embodiments, the method may include retaining water within a first adsorption column while simultaneously desorbing or releasing water, which was previously captured from an air source, from the second adsorption column. For example, the method may include capturing or retaining water from an air source (e.g., airflow passing through the water harvesting device) in a first adsorption column and/or a third adsorption column, while simultaneously desorbing or releasing water, which was previously captured from an air source, from a second adsorption column and/or a fourth adsorption column.

In accordance with example embodiments, the method may include initiating an airflow from the environment, into and through the second adsorption column including the plurality of hydrogel-based nanofibers, into and through the first adsorption chamber column including one or more MOF materials, and through the air outlet. In accordance with example embodiments, the method may include initiating an airflow from the environment, into and through the second adsorption column including the plurality of hydrogel-based nanofibers, into and through the first adsorption chamber column including one or more MOF materials, and through the air outlet.

In accordance with example embodiments, the method may include selecting the operation of a particular adsorption chamber based on the relative humidity of the environment. For example, a user may interact with a user interface of the water harvesting device to select one or more adsorption column having a particular sorbent material. For example, in an arid environment the user may select to operate (e.g., capture water from air) an adsorption column including one or more MOF materials.

In accordance with example embodiments, the method may include in-taking air from the environment that has an initial humidity of at least 30%, such as at least about any of the following: 30, 40, 50, 60, 70, 80, and 90%, and/or at most about any of the following: 100, 95, 90, 85, and 80%, and an intermediate airflow between the second adsorption column and the first adsorption column has a second humidity that is less than the initial humidity.

In accordance with example embodiments, the method may include performing a TSA process with one or more of the adsorption columns by cycling the temperature of the sorbent material (e.g., either directly or indirectly) and/or the air within the adsorption chamber to effectuate water capture or retention (e.g., adsorption, absorption) at a first temperature and effectuate desorbing or release of previously captured water by the sorbent material at a second temperature, in which the second temperature is larger than the first material. In this regard, the TSA process can include cycling the temperature of the sorbent material and/or the air within the adsorption chamber multiple times during operation to provide repeating cycles of capturing water from atmospheric air, desorbing and collecting the water captured, capturing a second batch of water from atmospheric air, desorbing the second batch of captured air and collecting the same, and so on.

In accordance with example embodiments, the temperature (e.g., either the temperature of sorbent material or the temperature of the air within the adsorption chamber) at which water capture is performed in the one or more adsorption chambers includes from about 0° C. to about 50 C°, such as at least about any of the following: 0, 2, 5, 6, 8, 10, 12, 15, 16, 18, 20, 22, 25, 30, 40 and 50 C° and/or at most about any of the following: 50, 48, 46, 45, 44, 42, 40, 38, 36, 35, 34, 32, and 30° C.

In accordance with example embodiments, the method may include performing a PSA process with one or more of the adsorption columns by cycling the pressure within the adsorption chamber to effectuate water capture or retention (e.g., adsorption, absorption) at a first pressure and effectuate desorbing or release of previously captured water by the sorbent material at a second pressure, in which the second temperature is lower than the first material. In this regard, the PSA process can include cycling the pressure within the adsorption chamber multiple times during operation to provide repeating cycles of capturing water from atmospheric air, desorbing and collecting the water captured, capturing a second batch of water from atmospheric air, desorbing the second batch of captured air and collecting the same, and so on.

In accordance with example embodiments, the relative pressure within the adsorption chamber at which water capture is performed in the one or more adsorption chambers includes from about 0.01 to about 10, such as at least about any of the following: 0.01, 0.05, 0.1, 0.2, 0.4, 0.6, 0.8, 1, 1.5, 2, 2.5, 3, 3.5, 4, 4.5, and 5, and/or at most about any of the following: 10, 9, 8, 7, 6, and 5. In accordance with example embodiments, the relative pressure within the adsorption chamber at which water desorption is performed in the one or more adsorption chambers is less than the relative pressure in the at least one adsorption chamber during the water capturing operating conditions. With this proviso in mind, the relative pressure within the at least one adsorption chamber during water desorption may include from about 0.01 to about 9.5, such as at least about any of the following: 0.01, 0.05, 0.1, 0.2, 0.4, 0.6, 0.8, 1, 1.5, 2, 2.5, 3, 3.5, 4, 4.5, and 5, and/or at most about any of the following: 9.5, 9, 8, 7, 6, and 5.

In accordance with example embodiments, the pressure within the one or more adsorption chambers during a water retention/water capturing operational state may vary from 1 to 18 mm Hg (dew point) at 20° C. At 15° C., the pressure within the one or more adsorption chambers during a water retention/water capturing operational state may vary from 1 to 15 mm Hg (dew point). As noted above, the release of previously captured water by a desorption operation may be carried out at a reduced pressure.

These and other modifications and variations to the example embodiments described herein, or additional embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A water harvesting device, comprising:
   (i) at least one adsorption column, the at least one adsorption column including a first adsorption column including a first inlet, a first outlet, and a first interior region; and
   (ii) a sorbent material located within the first interior region of the first adsorption column, the sorbent material comprising:
      (a) a metal organic framework (MOF) material including a plurality of metal ions or clusters of metal ions coordinated to one or more organic linkers, wherein the MOF material includes a first MOF having an average pore size of at least about 10 angstroms (Å) and an average surface area of at least about 1200 $m^2/g$;
      (b) a plurality of nanofabrics comprising a hydrogel material; or
      (c) a combination of (a) and (b).

2. The water harvesting device of claim 1, wherein the at least one adsorption column comprises a temperature swing adsorption (TSA) column, a pressure swing adsorption (PSA) column, or both.

3. The water harvesting device of claim 2, wherein the at least one adsorption column further comprises a heat source operatively connected to at least a first TSA column.

4. The water harvesting device of claim 2, wherein the at least one adsorption column further comprises a vacuum source operatively connected to at least a first PSA column.

5. The water harvesting device of claim 1, wherein the first MOF has one or more of:
   an average pore size from about to about 300 Å;
   an average surface area from about 1200 $m^2/g$ to about 3500 $m^2/g$;
   a water uptake capacity from about 10 grams (g) to about 2000 g of water per kilogram (kg) of MOF material; and
   a water desorption percentage from about 15 percent (%) to about 100%.

6. The water harvesting device of claim 1, wherein the one or more organic linkers comprise hydrophilic organic linkers including poly(ethylene glycol) functionality, poly(vinyl alcohol) functionality, polyacrylamide functionality, polyglutamic acid functionality, acrylates, methacrylate, or any combinations thereof.

7. The water harvesting device of claim 1, wherein the sorbent material comprises a particulate-composite material (PCM) comprising (i) a binder material and (ii) one of the MOF and the plurality of nanofabrics.

8. The water harvesting device of claim 7, wherein
   the binder material comprises a natural polymeric material, a synthetic polymeric materials, a wax, or any combination thereof, and
   the PCM has an average diameter from about 1 mm to about 10 mm and a binder-to-sorbent ratio (grams of binder/grams of sorbent) of from 1:10 to 10:1.

9. The water harvesting device of claim 1, further comprising an air inlet and an air outlet, wherein
   the at least one adsorption column further comprises a second adsorption column including a second inlet, a second outlet, and a second interior region,
   the first interior region houses the MOF material and the second interior region houses the plurality of nanofabrics,
   the air inlet being is selectively and operatively coupled to both the first inlet and the second inlet, and
   the air outlet is selectively and operatively coupled to both the first outlet and the second outlet.

10. A water harvesting device, comprising:
    (i) at least one adsorption column, the at least one adsorption column including a first adsorption column including a first inlet, a first outlet, and a first interior region; and
    (ii) a sorbent material located within the first interior region of the first adsorption column, the sorbent material comprising a plurality of nanofabrics comprising a plurality of nanofibers comprising a hydrogel material, and
    the plurality of nanofibers have an average diameter from about 0.5 nm to about 1000 nm.

11. The water harvesting device of claim 10, wherein the plurality of nanofibers comprise at least one of electrospun fibers, melt spun fibers, and solution spun fibers.

12. The water harvesting device of claim 10, wherein at least a portion of the plurality of nanofibers includes a plurality of pores along a respective surface, throughout a respective thickness, or a combination thereof.

13. The water harvesting device of claim 10, wherein the plurality of nanofibers has one or more of the following: an average surface area from 500 to 5000 $g/m^2$, a water uptake capacity from 0.1 to 10 grams (g) of water per gram of the plurality of nanofibers, and a water desorption percentage from 15 to 100%.

14. The water harvesting device of claim 10, wherein the hydrogel material comprises a polyvinyl alcohol functionality, a polyethylene glycol functionality, an acrylate functionality, imidazole or imidazolium functionality, N-vinyl imidazole and derivatives thereof, an ionomer, collagen, gelatin, fibrin, or any combination thereof.

15. The water harvesting device of claim 10, wherein the hydrogel material includes poly(ethylene glycol) functionality, poly(vinyl alcohol) functionality, polyacrylamide functionality, polyglutamic acid functionality, acrylates, methacrylate, or any combinations thereof.

16. The water harvesting device of claim 10, wherein the hydrogel material comprises a copolymer of an acrylamide functional monomer and an imidazolium functional ionomer with an optional diacrylamide.

17. A method of harvesting water from air, the method comprising:
   (i) providing a water harvesting device comprising at least one adsorption column, the at least one adsorption column including a first adsorption column including a first interior region and a first sorbent material located within the first interior region of the first adsorption column, the first sorbent material comprising:
      (a) a metal organic framework (MOF) material including a plurality of metal ions or clusters of metal ions coordinated to one or more organic linkers, wherein the MOF material includes a first MOF having an average pore size of at least about 10 angstroms (Å) and an average surface area of at least about 1200 $m^2/g$;
      (b) a plurality of nanofabrics comprising a plurality of nanofibers comprising a hydrogel material, wherein the plurality of nanofibers have an average diameter from about 0.5 nm to about 1000 nm; or
      (c) a combination of (a) and (b);
   (ii) initiating intake of air from an environment into the water harvesting device;
   (iii) retaining water on or within the first sorbent material;
   (iv) releasing at least a portion of the water retained by the first sorbent material by directly or indirectly increasing a temperature of the first sorbent material;
   (v) collecting at least a portion of the released water.

18. The method of claim 17, wherein the at least one adsorption column further includes a second adsorption column including a second interior region and a second sorbent material located within the second interior region of the second adsorption column, and the method further comprises operating the first adsorption column in a first set of operating conditions and capturing water from the air from the environment, while simultaneously operating the second adsorption column in a second set of operating conditions and releasing at least a portion of any previously captured water from the second adsorption column.

19. The method of claim 18, wherein the first adsorption column and the second adsorption column are each TSA columns, and the device includes at least one heat and/or power source that directly or indirectly supplies heat to the second adsorption column during the step of operating the second adsorption column in a second set of operating conditions and releasing at least a portion of any previously captured water from the second adsorption column.

20. The method of claim 18, wherein the first adsorption column and the second adsorption column are each PSA columns, and the device includes at least one vacuum source that directly or indirectly lowers an internal pressure within the second adsorption column during the step of operating the second adsorption column in a second set of operating conditions and releasing at least a portion of any previously captured water from the second adsorption column.

* * * * *